United States Patent [19]

Fujihara et al.

[11] 4,344,514

[45] Aug. 17, 1982

[54] ELECTRIC SWITCH APPARATUS FOR AUTOMOBILE POWER TRAIN CLUTCH

[75] Inventors: Youji Fujihara, Ikeda; Masami Shiba, Osaka; Toshio Hazama, Toyonaka; Shozo Kito, Nagoya, all of Japan

[73] Assignees: Daihatsu Motor Co., Ltd., Osaka; Kabushiki Kaisha Tokai Rika Denki Seisakusho, Aichi, both of Japan

[21] Appl. No.: 178,632

[22] Filed: Aug. 15, 1980

[30] Foreign Application Priority Data

Mar. 11, 1980 [JP] Japan .................................. 55-31263

[51] Int. Cl.³ ............................................. B60K 41/00
[52] U.S. Cl. ................................ 192/3.58; 192/3.62; 192/0.08; 74/473 R
[58] Field of Search .................... 192/3.56, 3.58, 3.59, 192/3.61, 3.62, 0.08; 200/61.88, 61.86; 74/473 R, 473 P, 471 XY, 866

[56] References Cited

U.S. PATENT DOCUMENTS

| | | | |
|---|---|---|---|
| 2,732,447 | 1/1956 | Findley | 192/3.56 |
| 4,131,184 | 12/1978 | Rumyantsev et al. | 192/3.58 |
| 4,144,424 | 3/1979 | Takeda | 192/3.59 |
| 4,158,404 | 6/1979 | Yamashita et al. | 192/3.58 |
| 4,183,424 | 1/1980 | Rumyantsev et al. | 192/3.58 |

*Primary Examiner*—George H. Krizmanich
*Attorney, Agent, or Firm*—Wenderoth, Lind & Ponack

[57] ABSTRACT

In an automotive power train using a manually shiftable transmission unit and an automatically controlled clutch unit, the clutch unit is operated by an actuator device including an electromagnetic control. This electromagnetic control is controlled by means of an electric switch apparatus comprising a stroke switch assembly and a knob switch assembly. The stroke switch assembly includes a parallel connected combination of first and second switches to be closed in response to the movement of a transmission gearshift in different directions opposite to each other and the knob switch assembly includes a parallel connected combination of third and fourth switches to be opened in response to the movement of a gearshift knob in opposite directions. These switches are controlled in accordance with predetermined schedules.

15 Claims, 16 Drawing Figures

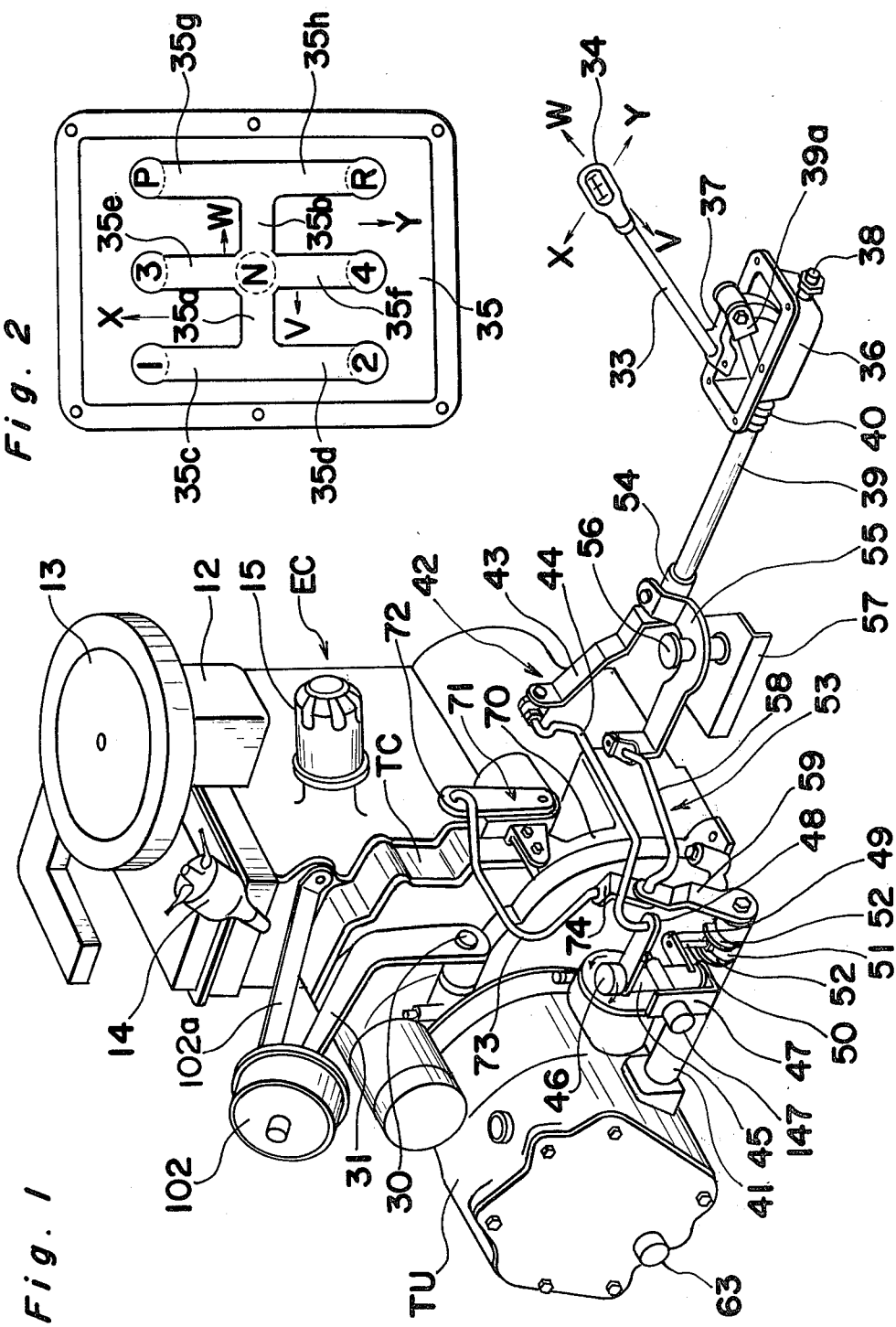

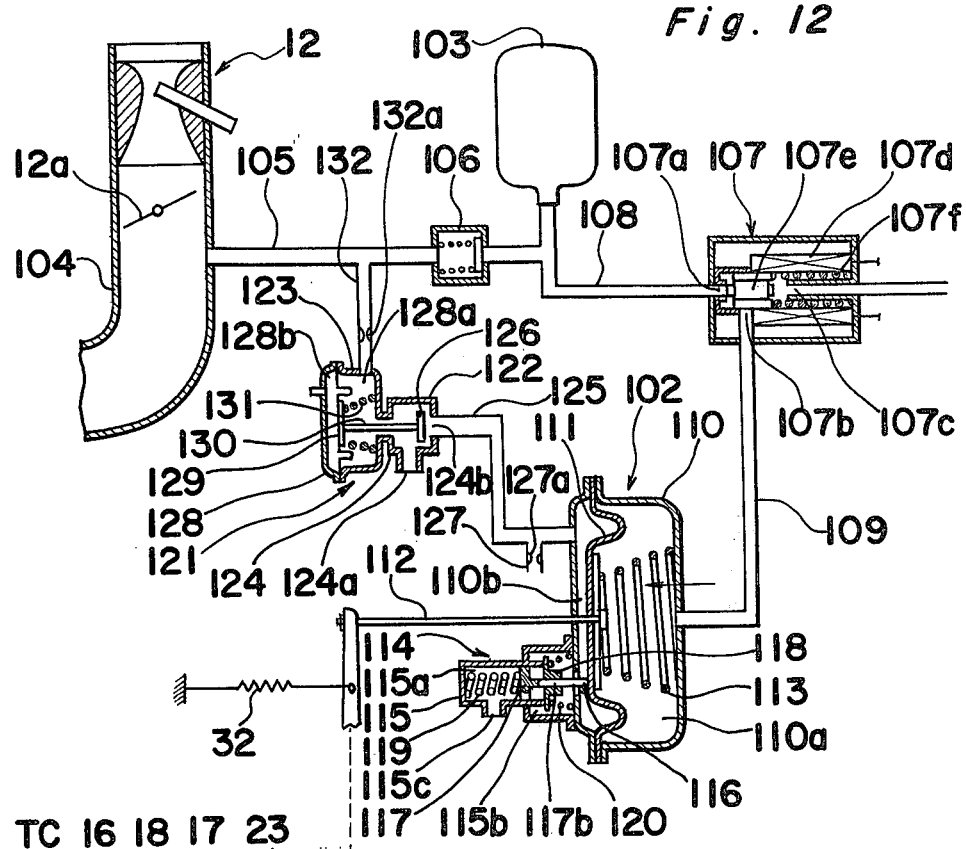
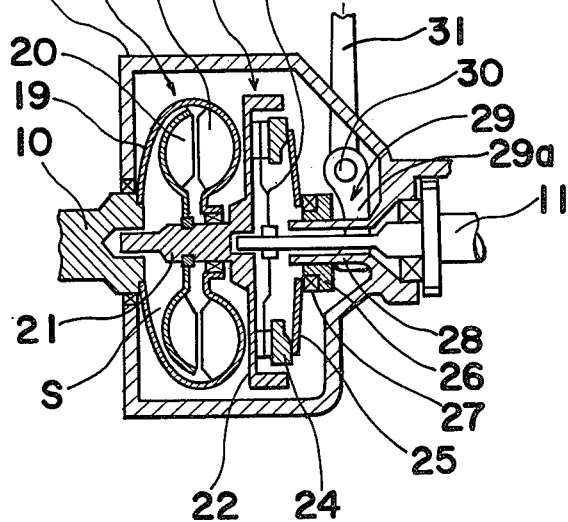
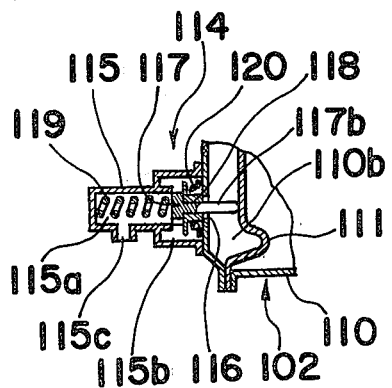
Fig. 12
Fig. 13

ELECTRIC SWITCH APPARATUS FOR AUTOMOBILE POWER TRAIN CLUTCH

BACKGROUND OF THE INVENTION

The present invention relates to an electric switch apparatus for sequentially operating a clutch in an automobile power transmission.

In an automobile having an automotive power train using a manually shiftable transmission and a foot-operated clutch unit interposed between the transmission and the output shaft of the automobile engine, gear shifts are effected by manipulating a gearshift lever mounted on the steering column or the floorboard. In general, before the gearshift lever is to be moved to make a gear shift in the transmission, the driver of the automobile is required to depress a clutch pedal to uncouple the clutch unit which has been transmitting the engine drive to the power input shaft of the transmission. The gear-shift lever is thus manipulated by the driver when the clutch unit is in uncoupled position interrupting the transmission of the engine drive to the power input shaft of the transmission. The clutch unit so uncoupled is coupled after the gear shift has been completed, to allow the engine drive to be transmitted to the power input shaft of the transmission.

With the automotive power train of the type described above, the manipulation of the gearshift lever requires skills for the driver to have and is time-consuming and laborious. In view of this, as an improved version effective to overcome these drawbacks and requiring less manufacturing cost than that of the known automotive power train using an automatic transmission and an automatically operated clutch unit, there is known an automotive power train using a manually shiftable transmission and an automatically operated clutch unit such as disclosed in, for example, U.S. Pat. No. 2,732,447, No. 3,910,388, No. 4,144,424 and No. 4,158,404.

SUMMARY OF THE INVENTION

The present invention pertains to the automotive power train of the type using a manually shiftable transmission unit and an automatically operated clutch unit and is intended to provide an improved electric switch apparatus therefor which is simple in construction, using a minimized number of switches, and which is, therefore, economical to manufacture and to install in an automotive vehicle in conjunction with the manually operable gearshift lever for the transmission unit.

According to the present invention, there is provided an electric switch apparatus for use in association with an automotive power train using a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between the automobile engine and the transmission unit and, when in the uncoupled position, interrupting such power transmission.

The electric switch apparatus embodying the present invention comprises an actuator means including an electromagnetic control electrically connected to a source of electric power and operable to bring the clutch unit into the uncoupled and coupled positions when the electromagnetic control is energized and de-energized, respectively, a control circuit for selectively opening and completing a circuit between the electromagnetic control and the electric power source, and a switching circuit including a stroke switch assembly and a knob switch assembly connected in series with each other for controlling the operation of the control circuit. The stroke switch assembly includes normally opened first, second and third switches, said first switch being closed in response to the movement of the gearshift lever in the first gear-shifting direction, said second switch being closed in response to the movement of the gearshift lever in the second gear-shifting direction and said third switch being closed in response to the movement of the gearshift lever in any one of the first and second gear-shifting directions, all of said first to third switches being connected in parallel to each other.

The knob switch assembly is incorporated in a manipulatable knob assembly mounted on the gearshift lever for pivotal movement in first and second switching directions opposite to each other and includes a normally closed fourth switch connected in series with the second switch, a normally closed fifth switch connected in series with the first switch and a normally closed sixth switch connected in series with the third switch. The knob assembly when pivoted in the first switching direction by the application of an external manipulative force required to move the gearshift lever in the first gear-shifting direction opens the fourth and sixth switches, but opens the fifth switch when pivoted in the second switching direction by the application of another external manipulative force required to move the gearshift lever in the second gear-shifting direction.

The control circuit may comprise either a switching transistor connected in series with the electromagnetic control or a relay unit having a relay coil, connected between the electric power source and the switching circuit, and a relay switch connected in series with the electromagnetic control.

The first to third switches of the stroke switch assembly are preferably so designed that any one of the first and second switches is closed when the gearshift lever is moved from a neutral position a distance corresponding to 80 to 100% of the total stroke required for the gearshift lever to move from the neutral position to any one of the different gear positions of the corresponding group in the corresponding direction while the third switch is closed when the gearshift lever is moved from the neutral position a distance corresponding to 30 to 80% of said total stroke. By this arrangement, undesirable and/or unnecessary uncoupling of the clutch unit which would occur under the influence of vibrations of the transmission unit after the gear shift has been made can advantageously be avoided.

BRIEF DESCRIPTION OF THE DRAWINGS

These and other objects and features of the present invention will become apparent from the following description taken in conjunction with a preferred embodiment thereof with reference to the accompanying drawings, in which:

FIG. 1 is a perspective view of an automobile power plant to which the concept of the present invention is applied;

FIG. 2 is a top plan view of a top cover for a gearing box for the support of a gearshift lever, showing the pattern in which the gearshift lever is moved to different gear positions;

FIG. 12 is a diagram showing a clutch actuating fluid circuit to be controlled by the apparatus of the present invention;

FIG. 13 is a longitudinal sectional view of a portion of a two-motion valve assembly shown in FIG. 12, but in a different operative position;

DETAILED DESCRIPTION OF THE INVENTION

Figure 3:
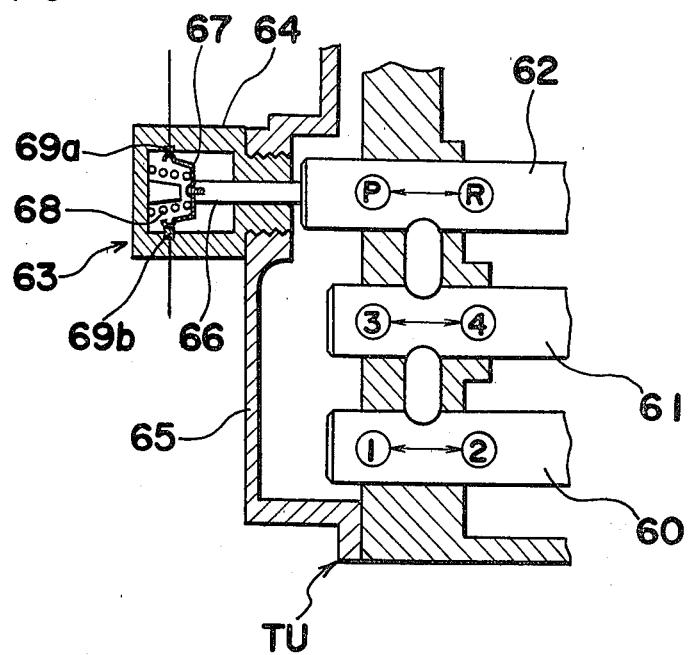
FIG. 3 is a schematic longitudinal sectional view of a portion of a transmission unit showing the details of a switch relative to transmission shifter forks.
Figure 4:
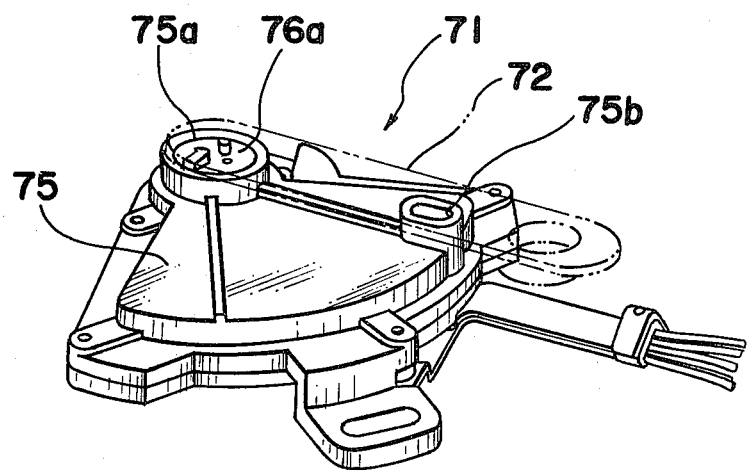
FIG. 4 is a perspective view of a stroke switch assembly used in the apparatus of the present invention.
Figure 5:
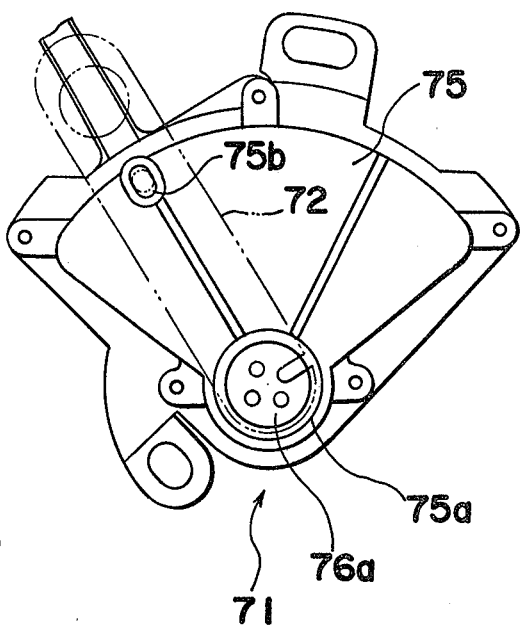
FIG. 5 is a top plan view of the stroke switch assembly shown in FIG. 4.

Before the description of the present invention proceeds, it is to be noted that like parts are designated by like reference numerals throughout the accompanying drawings.

Referring first to FIG. 1, there is shown an automobile power plant which may be of any known construction and which comprises an engine casing EC, a fluid coupling and clutch housing TC and a manually shiftable transmission unit TU on one side of the fluid coupling and clutch housing TC opposite to the engine casing EC, all being connected together in line with each other as is well known to those skilled in the art. The engine casing EC has a crank shaft 10 (FIG. 12) which, when a clutch assembly is held in a coupling position, is operatively coupled to a power input shaft 11 (FIG. 12) of the transmission unit TU to transmit an engine-powered rotational force from the automobile internal combustion engine to the transmission unit TU. The transmission unit TU in turn transmits the rotational force through an output shaft (not shown) to vehicle front axles (not shown) by means of a final drive unit and a differential.

The engine casing EC is shown as having a carburetor 12, an air cleaner 13, an ignition distributor 14 and an oil filter 15, all mounted thereon in a known arrangement.

The fluid coupling and clutch housing TC houses therein a torque converter and a clutch assembly identified generally by 16 and 17 in FIG. 12. Referring to FIG. 12, the fluid coupling 16 comprises a driving member or impeller 18 rigidly mounted on the crank shaft 10 through a torque converter torus cover 19, and a driven member or turbine 20 rigidly mounted on an intermediate shaft 21 and positioned within a space S defined by the impeller 18 and the torus cover 19. The intermediate shaft 21 has one end received in the crank shaft 10 for rotation independently of the crank shaft 10 and the other end rigidly connected, or otherwise integrally formed, with a clutch wheel 22 forming a part of the clutch assembly 17. In this construction, a rotational force of the crank shaft 10 can be transmitted to the intermediate shaft 21 through the impeller 18 then fluid-coupled to the turbine 20 as is well known to those skilled in the art.

Referring still to FIG. 12, the clutch assembly 17 shown therein is of a diaphragm-spring type and comprises, in addition to the clutch wheel 22, a clutch disc 23 mounted on the transmission input shaft 11 for movement axially of the shaft 11, an annular pressure plate 24 displaceable axially of the transmission input shaft 11 for selectively engaging and disengaging the pressure plate 24 to and from the clutch wheel 22, and a diaphragm spring 25 carrying the pressure plate 24 at an outer peripheral portion thereof. The diaphragm spring 25 is mounted on a throwout ring 26 by means of a clutch release bearing 27, said throwout ring 26 being axially displaceably mounted on a sleeve 28 which is integrally formed with the torque converter and clutch housing TC and extends inwardly of the housing TC in alignment with the crank shaft 10. The clutch assembly 17 further comprises a release lever 29 having forked ends 29a formed at one end thereof, said forked ends 29a straddling the inwardly extending sleeve 28 and positioned on respective sides of the sleeve 28 and in contact with the throwout ring 26. This release lever 29 is mounted on a clutch release shaft 30 having one end rigidly connected to the other end of the release lever 29 within the fluid coupling and clutch housing TC and the other end positioned externally of the fluid coupling and clutch housing TC, said other end of said release shaft 30 being in turn rigidly connected to a clutch operating lever 31. The clutch operating lever 31 is pivotable about the release shaft 30 between engaged and disengaged positions in a manner as will be described later and is normally biased to the engaged position by the action of a retracting spring 32 as shown in FIG. 12. When and so long as the clutch operating shaft 31 is held in the engaged position as shown in FIG. 12, the diaphragm spring 25 is dished in a direction away from the clutch wheel 22, applying a biasing force to the clutch disc 23 through the pressure plate 24 to cause the clutch disc 23 to press against the clutch wheel 22. In this condition, the rotational force of the crank shaft 10 transmitted to the intermediate shaft 21 can be transmitted to the transmission input shaft 11 through the clutch wheel 22 and then through the clutch disc 23, thereby completing a power transmission line between the internal combustion engine and the transmission unit TU. On the contrary, when the clutch operating shaft 31 is pivoted from the engaged position towards the disengaged position against the retracting spring 32 in a manner as will be described later, the release lever 29 pushes the throwout ring 26 to flex the diaphragm spring 25 in a direction close towards the clutch wheel 22 with the pressure plate 24 consequently displaced in a direction away from the clutch wheel 22. Upon displacement of the pressure plate 24 in the direction away from the clutch wheel 22, the clutch disc 23, which has been forced to contact the clutch wheel 22, is disengaged from the clutch wheel 22, thereby interrupting the power transmission line between the internal combustion engine and the transmission unit TU.

It is to be noted that, as shown in FIG. 12, the intermediate shaft 21 having one end inserted into the crank shaft 10 for rotation independently of the crank shaft 10 receives one end of the transmission input shaft 11 inserted thereinto for rotation independently of the intermediate shaft 21. Accordingly, the intermediate shaft 21 carrying both the turbine 20 and the clutch wheel 22 thereon is supported in alignment with any one of the crank shaft 10 and the transmission input shaft 11.

Referring back to FIG. 1, the transmission unit TU is operatively coupled with a gearshift lever 33 through a gearshift linkage system as will be described later. The gearshift lever 33 has one end provided with a knob assembly 34 accessible to the hand of an automobile driver and the other end so movably supported in a manner, as will be described later, as to enable the gearshift lever 33 to move in a predetermined pattern as shown in FIG. 2. In conjunction with the pattern of movement of the gearshift lever 33, the manually shiftable transmission unit TU employed for the purpose of the description of the present invention is assumed to be of the four-forward-speed and one-reverse-speed design having a parking-lock gear engageable with a mating pawl which may be fast with the transmission housing. As shown in FIG. 2, the gearshift lever 33 is correspondingly assumed to be movable from a neutral position "N" to six different gear positions which consist of first, second, third and fourth forward gear positions "1", "2", "3" and "4", a reverse-drive gear position "R" and a parking gear position "P". For this purpose, a top cover 35, which forms a part of a bearing box 36 installed on an automobile interior floor laterally adjacent the driver's seat and through which the gearshift lever 33 extends, has defined therein a pair of guide slots 35a and 35b extending away from the neutral position "N" for the gearshift lever 33 in the opposite directions V and W, respectively, in alignment with each other, another pair of guide slots 35c and 35d extending away from one end of the guide slots 35a remote from the neutral position "N" in the opposite directions X and Y, respectively, in alignment with each other, a further pair of guide slots 35e and 35f extending away from the neutral position "N" in the opposite directions X and Y, respectively, in alignment with each other, and a still further pair of guide slots 35g and 35h extending away from one end of the guide slot 35b remote from the neutral position "N" in the opposite directions X and Y, respectively, in alignment with each other. Corresponding free ends of the guide slots 35c, 35e and 35g, which are positioned on one side of the guide slots 35a and 35b of the pair opposite to the guide slots 35d, 35f and 35h, correspond respectively to the first forward, third forward and parking gear positions "1", "3" and "P" whereas corresponding free ends of the guide slots 35d, 35f and 35h positioned on the other side of the guide slots 35a and 35b of the pair correspond respectively to the second forward, fourth forward and reverse gear positions "2", "4" and "R".

As shown in FIG. 1, the end of the gearshift lever 33 opposite to the knob assembly 34 is rigidly mounted on a generally arcuate link 37 having one end fast with said gearshift lever 33 and the other end so connected to a wall of the bearing box 36 through a bearing shaft 38 by means of a universal joint (not shown) as to permit the link 37 to undergo both a rotary motion about the bearing shaft 38 and a pivotal movement in a plane parallel to the longitudinal axis of the bearing shaft 38. This link 37 is in turn operatively coupled to a shift and select lever 39 having a pair of spaced arms 39a defined at one end thereof, said spaced arms 39a being so designed and so connected to the link 37 that, when the link 37 is rotated about the bearing shaft 38 incident to the movement of the gearshift lever 33 in any one of the directions V and W, the shift and select lever 39 can be rotated about the longitudinal axis thereof and that, when the link 37 is pivoted in the plane parallel to the bearing shaft 38 incident to the movement of the gearshift lever 33 in any one of the directions X and Y perpendicular to the directions V and W, the shift and select lever 39 can be moved axially. It is to be noted that that portion of the shift and select lever 39 which loosely extends through the wall of the bearing box 36 opposite to the bearing shaft 38 has a dust-sealing diaphragm sleeve 40 mounted thereon to seal an annular clearance (not shown) formed between the shift and select lever 39 and the bearing box 36. It will, accordingly, readily be seen that the movement of the gearshift lever 33 in the opposite directions V and W results in the counterclockwise and clockwise rotation of the shift and select lever 39, respectively, whereas the movement of the gearshift lever 33 in the opposite directions X and Y results in the axial movement of the shift and select lever 39 away from and towards the bearing box 36, respectively.

The shift and select lever 39 is operatively coupled to a shift and select shaft 41, which extends rotatably and axially movably through the transmission housing, through separate first and second motion translating linkages so that, when the shift and select lever 39 is rotated and axially moved, the shift and select shaft 41 can be moved axially and rotated about its own longitudinal axis, respectively. More specifically, the first motion translating linkage, generally identified by 42 in FIG. 1, comprises a select arm member 43 rigidly connected at one end to the shift and select lever 39, a connecting rod 44 having one end rotatably connected to the other end of the select arm member 43 and the other end rotatably connected to a cylindrical sleeve 45 rotatably mounted on a support axle 46 rigidly mounted on a bearing bracket 47 fast with a vehicle chassis (not shown) and extending in a direction generally perpendicular to the shift and select shaft 41, said cylindrical sleeve 45 having first and second swing arms 48 and 49. These first and second swing arms 48 and 49 are rigidly connected to, or otherwise integrally formed with, the opposed ends of the cylindrical sleeve 45 and extend therefrom at right angles to the sleeve 45 having been offset from each other a predetermined angular distance with respect to the longitudinal axis of the sleeve 45. The free end of the first swing arm 48 is pivotally connected to the end of the connecting rod 44 remote from the arm member 43. On the other hand, the free end of the second swing arm 49 is engaged to the shift and select shaft 41 through a generally elongated actuating member 50 having one end fast with the second swing arm 49, the other end of said actuating member 50 being slidably engaged in an engagement groove 51 which extends a certain angular distance in a direction circumferentially of the shift and select shaft 41 and is defined by a pair of opposed arcuate projections 52 fast or integral with the shift and select shaft 41.

The first motion translating linkage 42 of the construction described above is so designed as to operate in the following manner. When the shift and select lever 39 is rotated, the end of the select arm 43 remote from the shift and select lever 39 undergoes a pivotal movement about the longitudinal axis of the shift and select lever 39. This pivotal movement of that end of the select arm 43 is transmitted through the connecting rod 44 to the first swing arm 48, thereby rotating the cylindrical sleeve 45 about the support axle 46. Upon rotation of the cylindrical sleeve 45 about the support axle 46, the actuating member 50 having one end fast with the cylindrical sleeve 45 through the second swing arm 49 and the other end engaged in the engagement groove 51 causes the shift and select shaft 41 to be moved axially. It is to be noted that, if the gearshift lever 33 is moved in the directions V and W one at a time, the shift and select shaft 41 is axially moved in the directions away from and towards the transmission housing, respectively.

The second motion translating linkage, generally identified by 53 in FIG. 1, comprises a guide sleeve 54 axially non-movably, but rotatably mounted on the shift and select lever 39, and a generally L-shaped shift lever 55 having one end pivotally connected to the guide sleeve 54, a substantially intermediate portion of said shift lever 54 being pivotally mounted through a support stud 56 on a support bracket 57 fast with the vehicle chassis. The second motion translating linkage 53 further comprises a connecting rod 58 having one end pivotally connected to the other end of the shift lever 54, and a shift arm 59 having one end pivotally connected to the other end of the connecting rod 58 and the other end rigidly secured to an outer end face of the shift and select shaft 41. This second motion translating linkage 53 is so designed as to operate in the following manner. When the shift and select lever 39 is axially moved, the shift lever 55 is pivoted about the support stud 56 because of the guide sleeve 54 axially non-movably mounted on the shift and select lever 39. (It is to be noted that the axial movement of the shift and select lever 39 is not transmitted to the first swing arm 48 fast with the cylindrical sleeve 45 because of the pivotal connection between the first swing arm 48 and the connecting rod 44.) The pivotal movement of the shift lever 55 is in turn transmitted to the shift and select shaft 41 through the connecting rod 58 and then through the shift arm 59, thereby rotating the shift and select shaft 41. It is to be noted that, if the gearshift lever 33 is moved in the directions X and Y one at a time, the shift and select shaft 41 is rotated in the directions counterclockwise and clockwise as viewed in FIG. 1.

The axial movement of the shift and select shaft 41 resulting from the movement of the gearshift lever 33 in the direction V or W brings an inner end portion of the shift and select shaft 41 into engagement with any one of three shifter forks 60, 61 and 62 which are operatively arranged and housed within the transmission housing in a manner as shown in FIG. 3. On the other hand, the rotary movement of the shift and select shaft 41 resulting from the movement of the gearshift lever 33 in the direction X or Y causes one of the three shifter forks 60 to 62, which has been engaged with the inner end portion of the shift and select shaft 41 as a result of the axial movement of the shift and select shaft 41, to move in a corresponding direction, either leftwards or rightwards as viewed in FIG. 3, to set a power transmission gear train of the transmission unit TU in a selected gear ratio. By way of example, assuming that the gearshift lever 33 is held in the neutral position "N" and the driver shifts the gearshift lever 33 from the neutral position "N" to the first forward gear position "1", the movement of the gearshift lever 33 in the direction V to the outer end of the guide slot 35a brings the inner end portion of the shift and select shaft 41 into engagement with the shifter fork 60 and the subsequent movement of the same gearshift lever 33 in the direction X along the guide slot 35c causes the shifter fork 60 to move in a direction leftwards as viewed in FIG. 3, whereby the transmission unit TU has the gear train set in a gear position corresponding to the first forward speed. A similar description applies even when the gearshift lever 33 is shifted to any one of the other gear positions, it being however to be understood that, when and so long as the gearshift lever 33 is set in the neutral position "N" located intermediately of the path consisting of the consecutive guide slots 35e and 35f, the inner end portion of the shift and select shaft 41 is always held in position to engage the shifter fork 61.

As shown in FIGS. 1 and 2, the transmission housing forming a part of the transmission unit TU carries a normally opened switch assembly 63 positioned exteriorly of the transmission housing. This normally opened switch assembly 63 is adapted to be closed to complete an electric circuit, as will be described later, only when the gearshift lever 33 has been shifted to the parking gear position "P". For this purpose, the switch assembly 63 comprises a switch casing 64 threadingly secured to an end cover 65 of the transmission housing, an operating rod 66 having one end situated within the switch casing 64 and the other end situated within the transmission housing in alignment with the shifter fork 62, a substantially intermediate portion of said operating rod 66 slidingly extending through the switch casing 64, an electroconductive bridge member 67 situated within the switch casing 64 and rigidly secured to said one end of the operating rod 66, a biasing spring 68 for biasing the operating rod 66 to assume an outwardly projected position, and a pair of fixed contact members 69a and 69b spaced from each other angularly with respect to the longitudinal axis of the operating rod 66. This switch assembly 63 is so designed that the fixed contact members 69a and 69b are electrically shortcircuited with each other through the electroconductive bridge member 67 only when the operating rod 66 is displaced to an inwardly retracted position, as shown in FIG. 3, against the spring element 68 with said other end of said operating rod 66 held in contact with the shifter fork 62. Accordingly, it will readily be seen that, when and after the gearshift lever 33 has been shifted to the parking gear position "P" with the shifter fork 62 consequently moved leftwards as viewed in FIG. 3 in the manner described above, the fixed contact members 69a and 69b are electrically connected to each other through the bridge member 67 to bring the switch assembly 63 in a closed position.

The transmission housing has rigidly secured thereto a differential casing 70 on which a stroke switch assembly 71 is rigidly mounted. This stroke switch assembly 71, the details of which will be described later with particular reference to FIGS. 4 to 7, has a switching arm 72 so operatively coupled to the shift arm 59 through a connecting rod 73 and then through a generally L-shaped coupling member 74 that the swinging motion of the shift arm 59 resulting from the axial movement of the shift and select lever 39 in the manner described hereinbefore can be transmitted to the switching arm 72 to cause the latter to pivot in a manner as subsequently be described.

Figure 6:
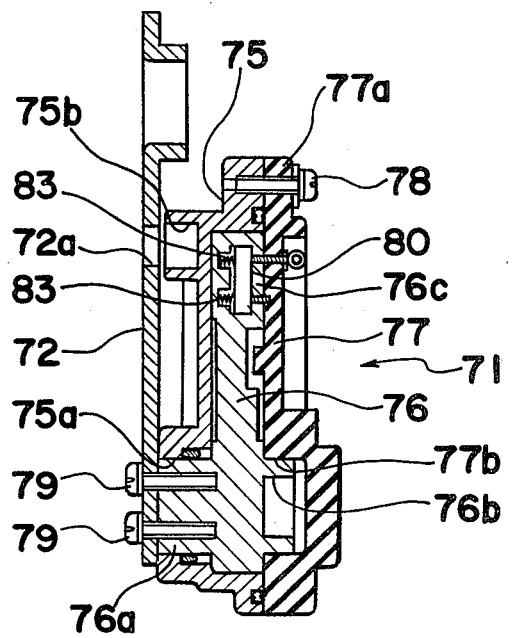
FIG. 6 is a side sectional view of the stroke switch assembly shown in FIG. 4.

Referring now to FIGS. 4 to 7, the stroke switch assembly 71 comprises a generally segment-shaped base board 75 preferably made of zinc material by the use of any known die-casting technique or any other metal molding technique and having a through-hole defined therein at 75a, a movable contact carrier 76 made of plastics and having solid and hollow bearing projections 76a and 76b formed integrally therewith and extending outwardly from the body of the contact carrier 76 in opposite directions in alignment with each other, and a switch board 77 having a peripheral flange 77a and a bearing recess 77b defined therein, said switch board 77 being secured to the base board 75 through the peripheral flange 77a by the use of a plurality of fastening members 78, for example, screws, with the contact carrier 76 positioned operatively between the base board 75 and the switch board 77. With the contact carrier 76 being so positioned in the manner as hereinabove described, the solid and hollow bearing projections 76a and 76b both integral with the contact carrier 76 are rotatably inserted into the through-hole 75a and the bearing recess 77b, respectively, as best shown in FIG. 6. The contact carrier 76 is in turn coupled to the switching arm 72 having one end pivotally connected to the connecting rod 73 as shown in FIG. 1 and the other end rigidly secured to the solid bearing projection 76a through one or more fastening members 79, for example, screws, so that the contact carrier 76 can pivot together with the switching arm 72 about the longitudinal axis of any one of the solid and hollow bearing projections 76a and 76b.

Figure 7:
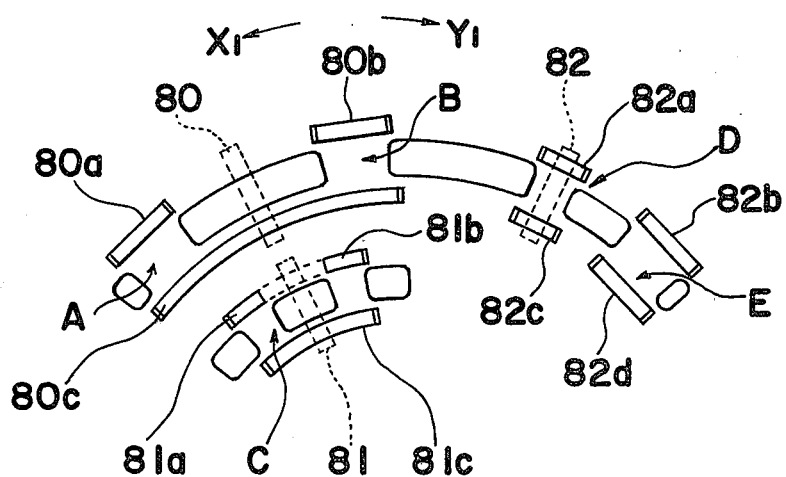
FIG. 7 is a schematic diagram showing the arrangement of various contact elements of the stroke switch assembly.

The contact carrier 76 has three movable contact bridges 80, 81 and 82 carried thereby for movement together with the contact carrier 76, the contact bridges 80 and 81 being positioned one above the other in alignment with the imaginary line passing through the center of pivot of the contact carrier 76 at right angles to the longitudinal axis of the solid bearing projection 76a while the contact bridge 82 is positioned laterally of the contact bridge 80 with respect to the direction of pivotal movement of the contact carrier 76, as schematically shown in FIG. 7. All of these contact bridges 80 to 82 are carried by the contact carrier 76 in a similar manner and, accordingly, the manner by which only one of the contact bridges, for example, the contact bridge 80, is carried by the contact carrier 76 will now be described with particular reference to FIG. 6.

As best shown in FIG. 6, the contact bridge 80 is seated within a corresponding recess 76c defined on one surface of the contact carrier 76 facing the switch board 77 and is biased towards the switch board 77 by the action of spaced coil springs 83 interposed between the bottom of the corresponding recess 76c and the contact bridge 80.

The switch board 77 has, as best shown in FIG. 7, a plurality of sets of fixed contact elements 80a, 80b and 80c, 81a, 81b and 81c, and 82a, 82b, 82c and 82d, all fixedly disposed on one surface of the switch board 77 facing the movable contact carrier 76. The fixed contact elements 80a and 80b are spaced from each other and are arranged in an arcuate row extending in a direction parallel to the direction of pivotal movement of the movable contact carrier 76. The fixed contact element 80c is of a length sufficient to extend between the fixed contact elements 80a and 80b in parallel relation to the arcuate row of these contact elements 80a and 80b and is spaced from any one of the contact elements 80a and 80b a distance sufficient to permit the contact element 80c to be electrically connected through the movable contact bridge 80 on the contact carrier 76 to any one of the fixed contact elements 80a and 80b.

Likewise, the fixed contact elements 81a and 81b are spaced from each other and are arranged in an arcuate row parallel to the arcuate row of the fixed contact elements 80a and 80b, and the fixed contact element 81c is of a length sufficient to extend between the fixed contact elements 81a and 81b in parallel relation to the arcuate row of these contact elements 81a and 81b and is spaced from any one of the contact elements 81a and 81b a distance sufficient to permit the contact element 81c to be electrically connected through the movable contact bridge 81 on the contact barrier 76 to any one of the fixed contact elements 81a and 81b. It is to be noted that the fixed contact elements 81a and 81b should be electrically connected to each other by means of any suitable electric wiring. However, in the present invention, the fixed contact elements 81a and 81b are constituted by respective opposite ends of a single contact member having its substantially intermediate portion embedded in the switch board 77.

The fixed contact elements 82a to 82d are arranged in the path of movement of the movable contact bridge 82, each pair of the contact elements 82a and 82c or 82b and 82d being adapted to be electrically connected to each other through the movable contact bridge 82 depending on the position of the contact carrier 76.

The stroke switch assembly 71 of the construction described above is a sort of combination switch assembly comprising five switches A, B, C, D and E. The first switch A is constituted by the movable contact bridge 80 and the fixed contact elements 80a and 80c; the second switch B is constituted by the movable contact bridge 80, which also forms a part of the first switch A, the fixed contact element 80b and the fixed contact element 80c also forming a part of the first switch A; the third switch C is constituted by the movable contact bridge 81 and the fixed contact elements 81a, 81b and 81c; the fourth switch D is constituted by the movable contact bridge 82 and the fixed contact elements 82a and 82c; and the fifth switch E is constituted by the movable contact bridge 82, which also forms a part of the fourth switch D, and the fixed contact elements 82b and 82d.

The stroke switch assembly 71 is so designed as to operate as follows. In view of the fact that the switching arm 72 movable together with the constant carrier 76 is operatively coupled to the gearshift lever 33 in the manner described with reference to FIG. 1, the contact carrier 76 is held in a neutral position, where a positioning aperture defined at 72a in the switching arm 72 is aligned with a positioning recess defined at 75b in the base board 75, when and so long as the gearshift lever 33 is held in the neutral position "N" or moved in any one of the guide slots 35a and 35b (FIG. 2) in a corresponding direction V or W, but can be pivoted in either one of the first and second directions opposite to each other, as shown by the respective arrows X1 and Y1 in FIG. 7, about the longitudinal axis of the bearing projection 76a or 76b depending on the direction X or Y in which the gearshift lever 33 is moved. In this neutral position of the contact carrier 76, the contact bridge 80 is positioned intermediately between the contact elements 80a and 80b as shown by the phantom line in FIG. 7, the contact bridge 81 is similarly positioned intermediately between the contact elements 81a and 81b as shown by the phantom line in FIG. 7, and the contact bridge 82 bridges between the contact elements 82a and 82b as shown by the phantom line in FIG. 7. In other words, when and so long as the contact carrier 76 is in the neutral position, the first, second, third and fifth switches A, B, C and E are opened while the fourth switch D is closed.

However, the contact of the contact bridge 80 to any one of the contact elements 80a and 80b to complete a corresponding electric circuit between the contact element 80a or 80b and the contact element 80c through the contact bridge 80 takes place when the contact carrier 76 being moved angularly from the neutral position in the first or second direction X1 or Y1 and, hence, the contact bridge 80, is moved an angular distance within the range of 80 and 100% of the entire stroke of movement of the contact carrier 76 in the corresponding direction X1 or Y1 from the neutral position. In other words, any one of the first and second switches A and B is closed when and after the contact carrier 76 has completed its angular movement in the corresponding direction X1 or Y1 within the range of 80 to 100% of the entire stroke of angular movement of the contact carrier 76.

Similarly, the contact of the contact bridge 81 to any one of the contact elements 81a and 81b to complete a corresponding electric circuit between the contact elements 81a or 81b and the contact element 81c through the contact bridge 81 takes place when the contact carrier 76 being moved angularly from the neutral position in the first or second direction X1 or Y1 and, hence, the contact bridge 81, is moved an angular distance within the range of 30 to 80% of the entire stroke of movement of the contact carrier 76 in the corresponding direction X1 or Y1 from the neutral position. In other words, because of the contact elements 81a and 81b is of one-piece construction or electrically connected to each other as hereinbefore described, the third switch C is closed whenever the contact carrier 76 is angularly moved in either one of the first and second directions X1 and Y1 within the range of 30 to 80% of the entire stroke of movement of the contact carrier 76 in either one of the first and second directions X1 and Y1.

The contact bridge 82 carried by the contact carrier 76 together with the other contact bridges 80 and 81, which completes an electric circuit between the contact elements 82a and 82c when and so long as the contact carrier 76 is in the neutral position, can be moved to a position bridging between the contact elements 82b and 82d to complete an electric circuit therebetween when the contact carrier 76 is moved angularly in the direction Y1 from the neutral position. In other words, when the contact carrier 76 is pivoted in the direction Y1 from the neutral position, the fifth switch E is closed while the fourth switch D is opened.

The details of the knob assembly 34 mounted on the gearshift lever 33 as shown in FIG. 1 will now be described with particular reference to FIGS. 8 to 11.

Figure 8:
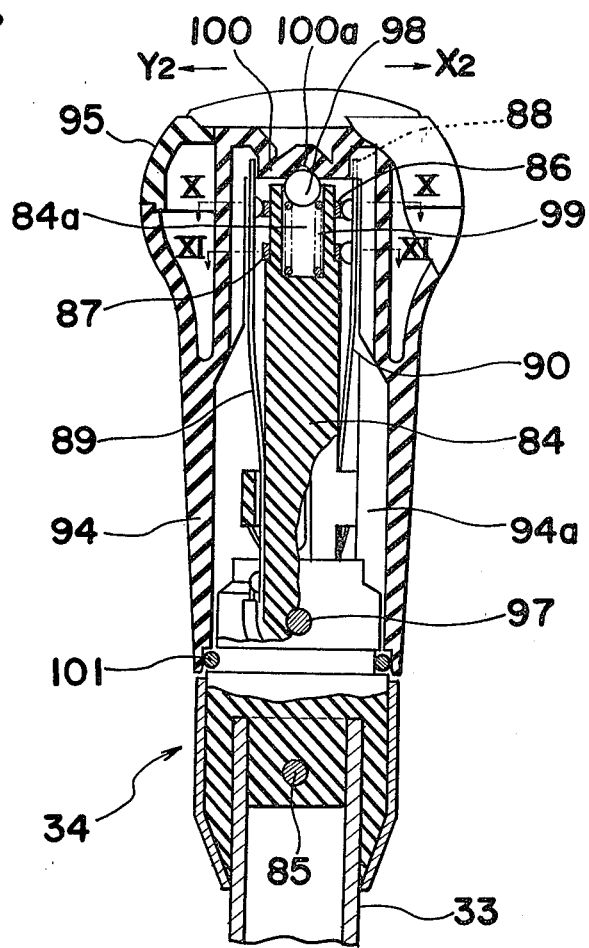
FIG. 8 is a longitudinal sectional view of a knob assembly as viewed in one direction, showing the details of switches incorporated in the knob assembly.
Figure 14:
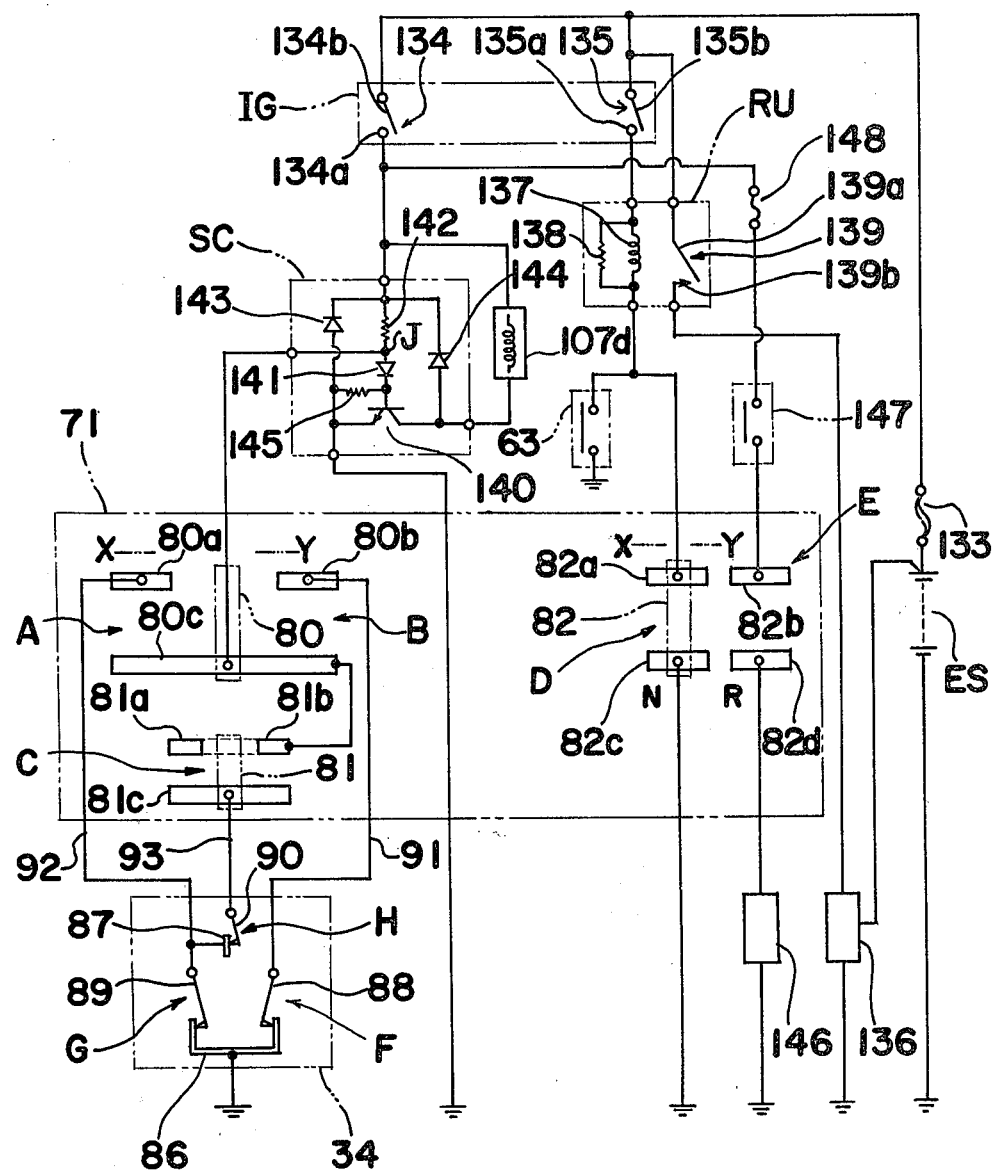
FIG. 14 is an electric circuit diagram in which the apparatus of the present invention is incorporated.
Figure 15:
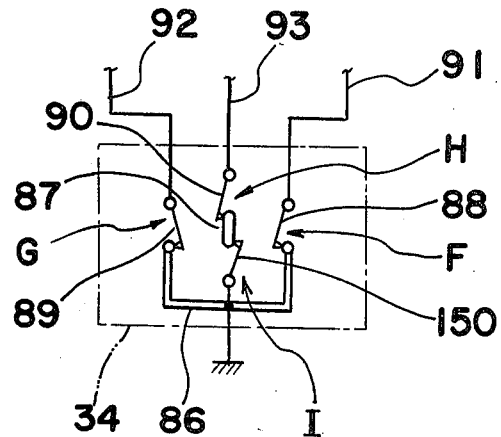
FIG. 15 is an electric circuit diagram showing the switches in the knob assembly according to a modified form of the present invention.

Referring now to FIGS. 8 to 11, the knob assembly 34 comprises a generally elongated carrier block 84 made of plastics and having one end portion receiving and non-detachably connected by means of a cross pin 85 to the free end of the gearshift lever 33. The other end portion of the carrier block 84 is of generally rectangular cross-section and has a pair of fixed contact bands 86 and 87 of electroconductive material fixedly turned therearound in spaced relation to each other with respect to the longitudinal axis of the carrier block 84. This carrier block 84 carries first, second and third movable contact members 88, 89 and 90 each being made of electroconductive and elastic material and fixedly secured at one end to a substantially intermediate portion of the carrier block 84 by any suitable connecting method, for example, by inserting tightly into or through a corresponding bearing aperture 84a defined on a respective side face of the carrier block 84 as shown in FIG. 8. These contact members 88, 89 and 90 extend upwardly from the substantially intermediate portion of the carrier block 84, to which they are secured, and terminate adjacent the top of the carrier block 84. It is to be noted that the first and third contact members 88 and 90 are positioned one side of the carrier block 84 in laterally spaced and side-by-side relation to each other while the second contact member 89 is positioned on the opposite side of the same carrier block 84. The free end of each of the first and second contact members 88 and 89 is normally urged to, and therefore is held in contact with, the contact band 86 by the action of the resiliency of the corresponding contact member 88 or 89. Similarly, the free end of the third contact member 90 is normally urged to, and therefore is held in contact with, the contact band 87 by the action of the resiliency of such contact member 90. As shown in FIG. 14, the contact band 86 is electrically grounded while the contact band 87 is electrically connected to the second contact member 89 by means of a suitable wiring built in the knob assembly 34. On the other hand, the first, second and third contact members 88 to 90 are electrically connected respectively to the fixed contact element 80b, the fixed contact element 80a and the fixed contact element 81c of the stroke switch assembly 71 by means of associated wirings 91, 92 and 93.

In the construction so far described, it will readily be seen that the contact band 86 and the first contact member 88 constitute a sixth switch F, the contact band 86 and the second contact member 89 constitute a seventh switch G, and the contact band 87 and the third contact member 89 constitute an eighth switch H.

Referring still to FIGS. 8 to 11, the knob assembly 34 further comprises a generally elongated knob body 94 having an axially extending cylindrical hollow 94a defined therein, one end of said hollow 94a being opened and the other end thereof being closed by an end wall 94b, and a cap member 95 which is shown as secured to the closed end of the knob body 94 by the use of a plurality of screw members 96. However, the cap member 95 may be either secured to the closed end of the knob body 94 by the use of any suitable bonding agent or formed integrally with the knob body 94.

The knob body 94 is mounted on the carrier block 84 with the rectangular cross-sectioned end portion of said carrier block 84 inserted loosely into the cylindrical hollow 94a. This knob body 94 so mounted is pivotally connected to the carrier block 84 by means of a transverse pivot pin 97 having its opposed ends journalled to the knob body 84, a substantially intermediate portion of said pivot pin 97 extending completely through the carrier block 84 in a direction generally parallel to the direction in which the first and second contact members 88 and 89 are opposed to each other on respective sides of the carrier block 84, so that the knob body 94 with the cap member 95 thereon can manually be pivoted between pulled and pressed positions about the transverse pivot pin 97. However, so long as neither a pulling force nor a pressing force is applied to the knob body 94, the knob body 94 is held in a neutral position, located intermediately between the pulled and pressed positions, by the action of a detent mechanism of a construction which will now be described with particular reference to FIG. 8.

The detent mechanism comprises a detent ball 98, accommodated in an axially extending cavity 84a defined in the carrier block 84 adjacent the end wall 94b, a biasing spring 99 accommodated in the cavity 84a and biasing the detent ball 98 so as to protrude outwardly from the cavity 84a, and a detent recess 100a. The detent recess 100a is defined in an axial projection 100 of generally rectangular cross-section integrally formed with the end wall 94b and protruding therefrom into the hollow 94a in alignment with the longitudinal axis of the carrier block 84, terminating at a position spaced a slight distance from the top of the carrier block 84. This detent mechanism is so designed that, when the knob body 94 is pivoted about the transverse pivot pin 97 in either direction shown by the respective arrow X2 or Y2 in FIGS. 8, 10 and 11 by the application of the corresponding manipulating force thereto, the detent ball 98 partially engaged in the detent recess 100a in the axial projection 100 in a manner as shown in FIG. 8 can be forced to retract inwardly of the cavity 84a against the biasing spring 99, escaping out of the detent recess 100, it being however to be understood that, when the corresponding manipulating force which has been applied to the knob body 94 is released, the knob body 94 can automatically return to the original neutral position by the action of the biasing spring 99.

The axial projection 100 integral with the end wall 94b is so sized that, when the knob body 94 is in the neutral position as shown, the free end of each of the first and second contact members 88 and 89 is spaced a slight distance from the peripheral face of the axial projection 100. As will become clear from the subsequent description, this axial projection 100 concurrently serves as means for disengaging the contact members 88 and 89 from the contact band 86 one at a time and depending on the direction in which the knob body 94 is pivoted.

Figure 10:
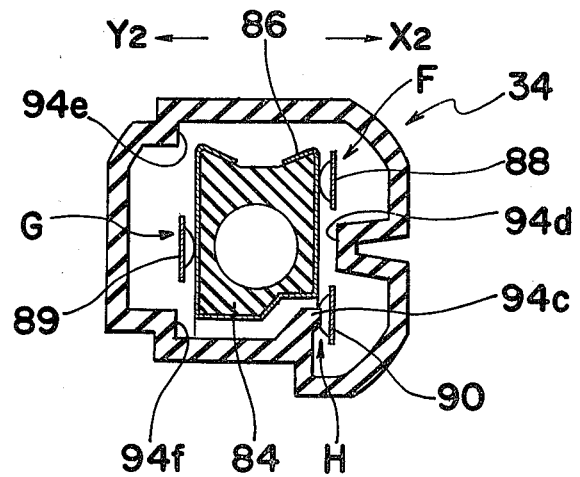
FIG. 10 is a cross sectional view taken along the line X in FIG. 8.
Figure 9:
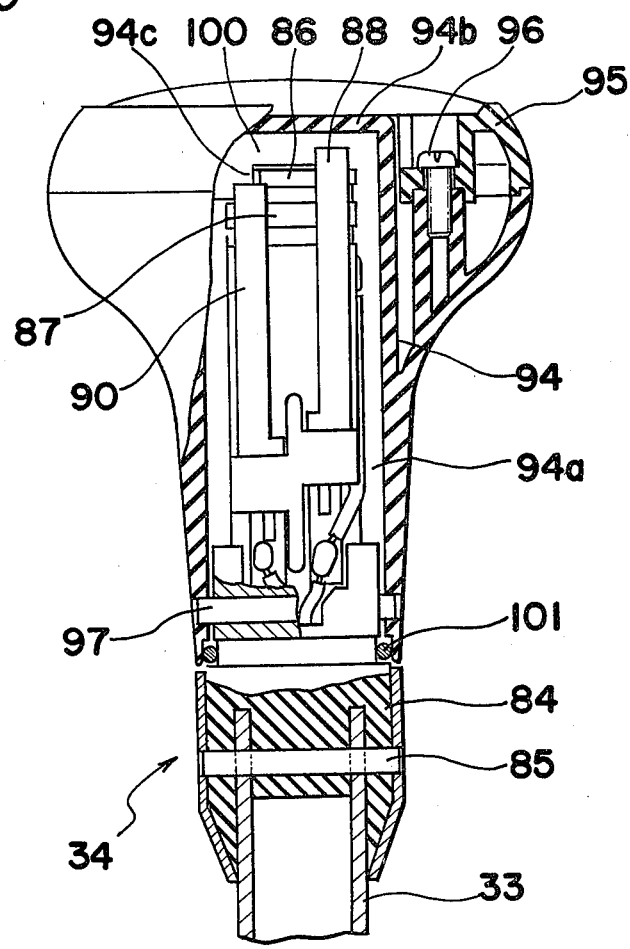
FIG. 9 is a view similar to FIG. 8, the knob assembly being shown as viewed in a different direction.

As a means for disengaging the third contact member 90 from the contact band 87 which is normally engaged thereto by the action of its own resiliency, the knob body 94 is integrally formed with a lateral projection 94c protruding into, and in a direction perpendicular to, the hollow 94a and terminating at a position spaced a slight distance from the free end of the contact member 90 as best shown in FIG. 10. This lateral projection 94c is adapted to forcibly disengage the contact member 90 from the contact band 87 only when the knob body 94 is pivoted about the transverse pivot pin 97 in the direction X2.

Reference numeral 101 represents an O-ring made of an elastic material interposed between the lower end of the knob body 94 and the carrier block 84. This O-ring 101 serves not only to prevent foreign matters from entering the hollow 94a, but also to provide an additional biasing force which, in cooperation with the biasing force of the spring 99, urges the knob body 94 to assume the neutral position.

Figure 11:
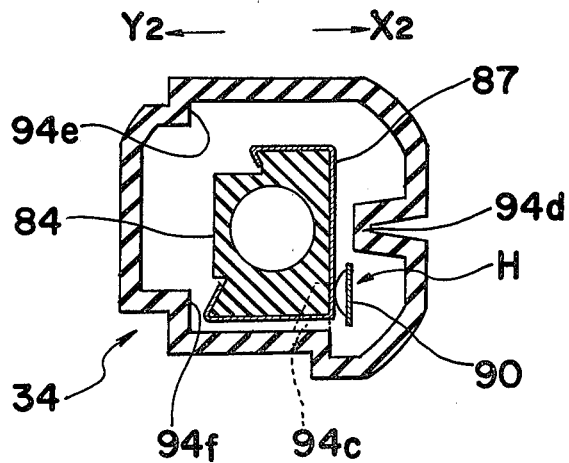
FIG. 11 is a cross sectional view taken along the line XI in FIG. 8.

In the construction described above, when the pressing force is applied to the knob body 94 in an attempt to move the gearshift lever 33 in the direction X, the knob body 94 is pivoted in the direction X2 until a pair of spaced stopper projections formed at 94e and 94f integrally with the knob body 94 as best shown in FIGS. 10 and 11 abut against the carrier block 84. As the knob body 94 is so pivoted in the direction X2, the axial projection 100 and the lateral projection 94c are respectively engaged to the free ends of the associated contact members 88 and 90, thereby disengaging the contact members 88 and 90 from the associated contact bands 86 and 87. By so doing, the sixth and eighth switches F and H can be opened while the second contact member 98 remains engaged to the contact band 86, that is, the seventh switch G remains closed.

On the other hand, when the pulling force is applied to the knob body 94 in an attempt to move the gearshift lever 33 in the direction Y, the knob body 94 is pivoted in the direction Y2 until a lateral projection 94d integral with the knob body 94 and protruding laterally into the hollow 94a as best shown in FIGS. 10 and 11 abuts against the carrier block 84. As the knob body 94 is so pivoted in the direction Y2, the axial projection 100 is engaged to the free end of the second contact member 89, thereby disengaging the contact member 89 from the contact band 86. By so doing, the seventh switch G can be opened while the sixth and eighth switches F and H remain closed.

The automobile power plant further comprises a vacuum operated actuator 102 of a construction, which will now be described with reference to FIGS. 12 and 13, said actuator 102 being mounted on the engine casing EC by means of one or more leg members 102a as shown in FIG. 1.

Referring now to FIGS. 12 and 13, there is shown a clutch actuating fluid circuit including the actuator 102 incorporated therein. The clutch actuating fluid circuit shown therein comprises a vacuum reservoir 103 communicated to a fuel intake manifold 104 of the automobile engine by means of a fluid passage 105 having one end in communication with the vacuum reservoir 103 and the other end opening towards a portion of the intake manifold 104 downstream of a known throttle valve 12a with respect to the direction of flow of air-fuel mixture towards one or more combustion chambers (not shown) of the engine. The fluid passage 105 has a check valve 106 disposed thereon, said check valve 106 being operable to complete the communication between the vacuum reservoir 103 and the intake manifold 104 only when a negative pressure is developed inside the intake manifold 104. The fluid circuit further comprises an electromagnetically operated two-way valve assembly 107 having three ports 107a, 107b and 107c; the port 107a being communicated to the vacuum reservoir 103 through a fluid passage 108; the port 107b being communicated to the actuator 102 in a manner as will be described subsequently through a fluid passage 109; and the port 107c being communicated to the atomosphere. This valve assembly 107 also has an electromagnetic coil 107d, a valve member 107e and a biasing spring 107f, all incorporated therein, and is so designed that, when and so long as the electromagnetic coil 107d is not electrically energized, the valve member 107e is held in position to close the port 107a and, on the other hand, to communicate the port 107b to the port 107c. However, when the electromagnetic coil 107d is electrically energized in a manner as will be described later, the valve member 107e is moved against the biasing spring 107f so that the ports 107a and 107b are communicated to each other while the port 107c is closed by the valve member 107e.

The vacuum operated actuator 102 comprises a valve casing 110, a diaphragm member 111 accommodated in the valve casing 110 and dividing the interior of the valve casing 110 into negative and atmospheric chambers 110a and 110b on respective sides of said diaphragm member 111, a connecting rod 112 having one end rigidly secured to the diaphragm member 111 and the other end operatively coupled to the free end of the clutch operating lever 31, and a biasing spring 113 housed within the negative chamber 110a, said diaphragm member 111 being normally biased by the biasing spring 113 in a direction leftwards as viewed in FIG. 12. It is the negative chamber 110a to which the fluid passage 109 leading from the port 107b of the valve assembly 107 is communicated.

The valve casing 110 of the actuator 102 carries a two-motion valve assembly 114 comprising a generally elongated valve casing 115 which has a first chamber 115a, defined therein at one end thereof remote from the valve casing 110, and a second chamber 115b defined therein at the opposite end thereof, said valve casing 115 being secured to the valve casing 110 with the second chamber 115b located adjacent to and on one side of a wall portion of the valve casing 110 facing the atmospheric chamber 110b. The first chamber 115a has an inner diameter smaller than that of the second chamber 115b and is communicated to the atmosphere through an exhaust port 115c. The second chamber 115b is communicated to the atmospheric chamber 110b in the valve casing 110 through one or more apertures 116 defined in that wall portion of the valve casing 110.

The two-motion valve assembly 114 further comprises a perforated plunger 117 accommodated within the first chamber 115a for movement in a direction axially of the valve casing 115 and having a push rod 117b integrally formed therewith and extending into the atmospheric chamber 110b through the second chamber 115b, and a seal ring 118 tightly, but movably mounted on the push rod 117b within the second chamber 115b for selectively interrupting and establishing the communication between the first and second chambers 115a and 115b. The plunger 117 is normally biased towards the right as viewed in FIG. 12 by the action of a biasing spring 119 while the seal ring 118 is normally biased by the action of a biasing spring 120 so as to interrupt the communication between the first and second chambers 115a and 115b. It is to be noted that the biasing force exerted by the biasing spring 119 within the first chamber 115a and acting on the plunger 117 must be smaller than the sum of the biasing forces of the spring 113 within the negative chamber 110a and the retracting spring 32. Accordingly, so long as no negative pressure is introduced into the negative chamber 110a in a manner as will be described later, the plunger 117 is separated from the seal ring 118, permitting the seal ring 118 to assume a position interrupting the communication between the first and second chambers 115a and 115b by the action of the biasing spring 120 while the biasing spring 119 is axially inwardly compressed to accumulate an axially outwardly pushing force, as shown in FIG. 12.

However, as shown in FIG. 13, when the diaphragm member 111 is displaced rightwards, as viewed in FIG. 12, against the spring 113 by the action of the negative pressure introduced into the negative chamber 110a, the plunger 117 is correspondingly displaced by the biasing spring 119 with the push rod 117b in engagement with the diaphragm member 111 and, during the continued movement of the plunger 117 as biased by the spring 119, the plunger 117 is engaged to and, hence, pushes, the seal ring 118 to move the latter against the spring 120. By so doing, the first and second chambers 115a and 115b are communicated to each other and, therefore, the atmospheric chamber 110b within the valve casing 110 is communicated to the exhaust port 115c through the apertures 116 and then through the perforation or perforations in the plunger 117.

The fluid circuit includes a vacuum responsive valve assembly 121 comprising a switching valve 122 and a control valve 123 for controlling the operation of the switching valve 122. The switching valve 122 comprises a valve casing 124 having an exhaust port 124a, communicated to the atmosphere, and an intake port 124b communicated to the atmospheric chamber 110b in the actuator 102 through a fluid passage 125, and a valve member 126 operatively housed in the valve casing 124 and adapted to selectively close and open the intake port 124b, that is, to selectively interrupt and establish the communication between the intake port 124b and the exhaust port 124a through the interior of the valve casing 124. A substantially intermediate portion of the fluid passage 125 is communicated to the atmosphere through an exhaust passage 127 having an orifice 127a defined therein. The control valve 123 comprises a valve casing 128, the interior of which is divided by a diaphragm member 129 into negative and atmospheric chambers 128a and 128b, an operating rod 130 having one end rigidly connected to the diaphragm member 129 and the other end rigidly connected to the valve member 126, and a biasing spring 131 housed within the negative chamber 128a and urging the diaphragm member 129 towards the left as viewed in FIG. 12. While the atmospheric chamber 128b is communicated to the atmosphere, the negative chamber 128a is communicated through a bypass passage 132 to a portion of the fluid passage 105 between the intake manifold 104 and the check valve 106, said bypass passage 132 having an orifice 132a defined therein.

The vacuum responsive valve assembly 121 of the above described construction is so designed that, when the negative pressure sufficient to overcome the biasing spring 131 is introduced into the negative chamber 128a, the diaphragm member 129 is displaced towards the right against the biasing spring 131 with the result that the valve member 126 connected to said diaphragm member 129 through the operating rod 130 closes the intake port 124b, it being however to be understood that, when the negative pressure within the negative chamber 128a is subsequently lowered below a predetermined value, for example, −250 mmHg, the diaphragm member 129 once displaced rightwards is displaced leftwards by the biasing spring 131 with the result that the valve member 126 opens the intake port 124b to communicate the atmospheric chamber 110b in the actuator 102 to the atmosphere through the passage 125, then the interior of the valve casing 128, and finally the exhaust port 124a.

In FIG. 14, there is shown an electric system in which the various electric components, including the stroke switch assembly 71 (that is, the switches A, B, C, D and E), the switch assembly incorporated in the knob assembly 34 (that is, the switches F, G and H) and the electromagnetic coil 107d of the electromagnetically operated valve assembly 107 are all incorporated. The electric system shown therein generally comprises an engine starting circuitry and a clutch control circuitry, the details of each of which will now be described with reference to FIG. 14.

The engine starting circuitry comprises a source of electric power ES, for example, an automobile battery, having positive and negative terminals, the negative terminal being grounded and the positive terminal electrically connected to an ignition switch unit IG through a fuse 133. The ignition switch unit IG of any known construction includes a main switch 134 and an auxiliary or starter switch 135. The engine starting circuitry further comprises an engine starter 136 of any known construction which, when electrically energized, cranks the automobile engine, said engine starter 136 being electrically connected to the positive terminal of the electric power source ES and also to the starter switch 135 through a relay unit RU.

The relay unit RU includes a relay coil 137 having one end electrically connected to a fixed contact 135a of the starter switch 135 and the other end electrically grounded through the switch assembly 63 and also through the switch D, a resistor 138 connected in parallel to the relay coil 137, and a relay switch 139 having a movable contact 139a, electrically connected to the positive terminal of the power source ES, and a fixed contact 139b electrically connected to the starter 136. This relay unit RU is so designed that, once the relay coil 137 is energized, the relay switch 139 is closed, with the movable contact 139a electromagnetically engaged to the fixed contact 139b, to allow the supply of an electric power from the power source ES to the starter 136.

The clutch control circuitry comprises a solenoid control circuit SC including a NPN-type switching transistor 140 having a base electrically connected to a fixed contact 134a of the main switch 134 through a diode 141 and a resistor 142, an emitter electrically connected to the fixed contact 134a of the main switch 134 through another diode 143 and also to the ground, and a collector electrically connected to the fixed contact 134a of the main switch 134 through parallel-connected diode 144 and the electromagnetic coil 107d of the electromagnetically operated valve assembly 107. The solenoid control circuit SC also includes a resistor 145 having one end connected to the base of the transistor 140 and the other end connected to the emitter of the transistor 104. The junction J between the diode 141 and the resistor 142 is electrically connected to the contact element 80c of the stroke switch assembly 71 of the construction as hereinbefore described with reference to FIGS. 4 to 7.

The electric system also comprises a backup light 146 for lighting the rearward of the automobile when the gearshift lever 33 is set to the reverse gear position. This backup light 146 is electrically connected to the fixed contact 134a of the main switch 134 through the switch E, a backup lighting switch 147 and a fuse 148. The backup lighting switch 147 is a normally opened switch and is, as shown in FIG. 1, carried by the support bracket 47. This backup lighting switch 147 is adapted to be closed only when the cylindrical sleeve 45 completes its rotation about the support axle 46 which is resulted from the movement of the gearshift lever 33 in the direction W from the neutral position.

While the electric switch system according to the present invention is constructed as hereinbefore described, it operates in the following manner.

Assuming that the gearshift lever 33 is in the neutral position without the knob body 94 being touched by the driver and the starter switch 135 is subsequently closed followed by the closure of the main switch 134 wherein a movable contact 134a is engaged to a fixed contact 134b, current from the power source ES flows through the relay coil 137 and the switch D which is then closed as hereinbefore described with reference to FIGS. 4 to 7, thereby energizing the relay coil 137 to close the relay switch 139. By so doing, the starter motor 136 is energized to crank the engine. Subsequent to the operation of the automobile engine so effected in the manner described above, a negative pressure is developed inside the intake manifold 104, the negative pressure inside the vacuum reservoir 103 being consequently reduced. At this time, since the first, second and third switches A, B and C in the stroke switch assembly 71 are all opened as shown in FIG. 14 and, on the other hand, the switches F, G and H in the knob assembly 34 on the gearshift lever 33 are all closed as shown in FIG. 14, the junction between the resistor 142 and the diode 141 in the solenoid control circuit SC is not grounded. Under these circumstances, a positive potential is applied to the base of the transistor 140 through the switch 134, the resistor 142 and the diode 141, whereby the transistor 140 is switched on to energize the electromagnetic coil 107d of the electromagnetically operated valve assembly 107 (FIG. 12).

When the electromagnetic coil 107d is so energized as hereinbefore described, the valve member 107e of the electromagnetically operated valve assembly 107 is moved towards the right as viewed in FIG. 12 against the spring 107f, thereby closing the port 107c on one hand and establishing the communication between the fluid passages 108 and 109 on the other hand. In this manner, the negative chamber 110a in the actuator 102 is communicated to the vacuum reservoir 103 through the electromagnetically operated valve assembly 107, the consequence of which is the introduction of the negative pressure into the negative chamber 110a. Accordingly, the diaphragm member 111 in the actuator 102 is displaced rightwards against the spring 113 with the operating rod 112 pulled rightwards to pivot the clutch operating lever 31 against the retracting spring 32 from the engaged position towards the disengaged position. As the clutch operating lever 31 is pivoted from the engaged position towards the disengaged position, the clutch assembly 71 is uncoupled in the manner described with reference to FIG. 12 to interrupt the transmission of the rotational force of the crank shaft 10 to the power input shaft 11 of the transmission unit TU.

It is to be noted that, when the diaphragm member 111 is displaced rightwards against the spring 113 as a result of the introduction of the negative pressure into the negative chamber 110a in the actuator 102, the two-motion valve assembly 114 is in position to communicate the atmospheric chamber 110b in the actuator 102 to the atmosphere through the aperture 116, then the second chamber 115b, the first chamber 115a and finally the exhaust port 115c.

From the foregoing, it is clear that, when and so long as the gearshift lever 33 is in the neutral position, the closure of the ignition switch unit results in disengagement of the clutch assembly 17 and, simultaneously therewith, the automobile engine is operated with the crank shaft 10 rotating in one direction.

After the automobile engine has been operated, and when the driver sets the transmission unit TU into the first gear position, he will move the gearshift lever 33 in the neutral position in the direction V along the guide slot 35a and then push the same in the direction X along the guide slot 35c, his hand grasping the knob assembly 34 on the gearshift lever 33 during the movement of the gearshift lever 33 from the neutral position to the first gear position "1". As the gearshift lever 33 is moved in the direction V along the guide slot 35a during the course of movement towards the first gear position "1", the shift and select shaft 41 is axially moved in the direction away from the transmission housing with the inner end portion thereof brought into engagement with the shifter fork 60. As the gearshift lever 33 is subsequently moved in the direction X towards the first gear position "1" along the guide slot 35c, the driver's hand still grasping the knob assembly 34, the pressing force is naturally applied to the knob body 94, pivoting the latter in the direction X2 about the transverse pivot pin 97, whereby the switches F and H incorporated in the knob assembly 34 are opened while the switch G in the knob assembly 34 remains closed in the manner as hereinbefore described.

During the movement of the gearshift lever 33 in the direction X towards the first gear position "1" along the guide slot 35c, not only is the shift and select shaft 41 is rotated counterclockwise to displace the shifter fork 60 leftwards as viewed in FIG. 3 to set the power transmission gear train of the transmission unit TU in a selected gear ratio corresponding to the first gear position of the gearshift lever 33, but also the switching arm 72 (FIGS. 1 and 4 to 6) is pivoted to move the contact carrier 76 in the direction X1 as shown in FIG. 7, thereby bringing the contact bridges 80 and 81 in respective positions to bridge between the contact elements 80a and 80c and between the contact elements 81a and 81c, that is, closing the first and third switches A and C.

More specifically, the third switch C in the stroke switch assembly 71 is first closed during the movement of the gearshift lever 33 through a distance corresponding to 30 to 80% of the total stroke of movement thereof from the junction between the guide slots 35a and 35c, that is, a position substantially intermediately between the neutral and first gear positions, to the first gear position "1" and, then, the first switch A in the same stroke switch assembly 71 is closed during the movement of the gearshift lever 33 through a distance corresponding to 80 to 100% of the total stroke of movement thereof from the intermediate position (between the neutral and first gear positions) to the first gear position. However, even though the third switch C is closed prior to the closure of the first switch A, the switch H in the knob assembly 34 is so opened in the manner described above that the junction J in the control circuit SC has not yet been grounded before the closure of the first switch A, that is, during the movement of the gearshift lever 33 through a distance corresponding to 0 to 80% of the total stroke of movement thereof from the intermediate position (between the neutral and first gear positions) to the first gear position. When and after the gearshift lever 33 has moved a distance larger than 80% of the total stroke of movement thereof from the intermediate position to the first gear position "1", the first switch A is closed and, accordingly, the junction J in the control circuit SC is grounded through the series-connected switches A and G. With the junction J so grounded as described above, the supply of the current to the base of the transistor 140 is interrupted with the transistor 140 consequently switched off, thereby deenergizing the electromagnetic coil 107d.

Upon deenergization of the electromagnetic coil 107d as a result of the switching-off of the transistor 140, the valve member 107e which has been held in position to communicate between the fluid passages 108 and 109 is moved by the action of the spring 107f to interrupt the communication between these passages 108 and 109 and to communicate the passage 109 to the atmosphere. As a result of this, the pressure difference between the chambers 110a and 110b in the actuator 102 becomes zero, permitting the diaphragm member 111 to be displaced leftwards as viewed in FIG. 12 by the action of the spring 113. The displacement of the diaphragm member 111 in the leftward direction as biased by the spring 113 takes place rapidly because air inside the atmospheric chamber 110b is quickly exhausted to the atmosphere through the valve assembly 114 rather than the passage 127 having the orifice 127a defined therein. Specifically, at the start of the displacement of the diaphragm member 111 in the direction leftwards as biased by the spring 113, the chamber 110a is communicated to the atmosphere through the apertures 116, the second chamber 115b, the first chamber 115a and the exhaust port 115c as hereinbefore described, and therefore, a relatively large amount of air inside the atmospheric chamber 110a can be quickly exhausted to the atmosphere, permitting the diaphragm member 111 to displace quickly in the leftward direction as viewed in FIG. 12.

Accordingly, shortly after the deenergization of the electromagnetic coil 107d, the operating rod 112 is returned to the original position by the action of the retracting spring 32 and, consequently, the clutch operating lever 31 is pivoted from the disengaged position to the engaged position whereby the clutch assembly 17 is coupled to transmit the rotational force of the crank shaft 10 to the power input shaft 11 of the transmission unit TU. It is to be noted that, shortly before the clutch assembly 17 is coupled, the seal ring 118 being moved leftwards together with the plunger 117 during the leftward displacement of the diaphragm member 111 is brought into a position to interrupt the communication between the first and second chambers 115a and 115b thereby interrupting the communication between the atmospheric chamber 110a and the atmosphere through the two-motion valve assembly 114. However, once the communication between the first and second chambers 115a and 115b is interrupted by the seal ring in the manner as shown in FIG. 12, the remaining air inside the atmospheric chamber 110a is exhausted to the atmosphere through a portion of the fluid passage 125 and then through the fluid passage 127.

More specifically, where the opening of the throttle valve 12a is so small as to allow the negative pressure inside the intake manifold 104 to develop to a value substantially equal to or higher than a predetermined value, for example, −350 mmHg, the diaphragm member 129 of the control valve 123 of the vacuum responsive valve assembly 121 is displaced rightwards as viewed in FIG. 12 against the spring 131 with the result that the switching valve 122 is held in a closed position to interrupt the communication between the intake port 124b and the exhaust port 124a through the interior of the casing 124. Accordingly, after the communication between the first and second chambers 115a and 115b in the two-motion valve assembly 114 has been interrupted in the manner described above, exhaust of the remaining air inside the atmospheric chamber 110a in the actuator 102 to the atmosphere through that portion of the fluid passage 125 and then through the fluid passage 127 takes place in a retarded manner, that is, at a low flow rate so that the return of the operating rod 112 in the direction as pulled by the retracting spring 32 can be effected at a controlled speed. This means that, as the clutch operating lever 31 pivoting from the disengaged position approaches the engaged position, the clutch operating lever 31 is braked to allow the coupling of the clutch assembly 17 to take place slowly.

On the other hand, where the opening of the throttle valve 12a is so large as to permit the negative pressure inside the intake manifold 104 to be lowered below the predetermined value of −250 mmHg, the diaphragm member 129 in the control valve 123 is not displaced rightwards, but is maintained as biased by the spring 131 and, accordingly, the switching valve 121 is held in an opened position to establish the communication between the intake port 124b and the exhaust port 124a through the interior of the valve casing 124. In this case, the exhaust of the remaining air inside the atmospheric chamber 110a in the actuator 102 after the communication between the first and second chambers 115a and 115b in the two-motion valve assembly 114 has been interrupted takes place so rapidly through the fluid passage 125 and then through the switching valve 121 then in the opened position. This means that the clutch assembly 17 is relatively quickly coupled.

In other words, the two-motion valve assembly 114 serves, in cooperation with the vacuum responsive valve assembly 121, to allow the clutch assembly 17 to be slowly coupled, when the opening of the throttle valve 12a is small and the automobile engine is rotated at a constant speed or is slowly accelerated, and to be quickly coupled when the opening of the throttle valve 12a is large and the automobile engine being operated is quickly accelerated. The combined use of the two-motion valve assembly 114 and the vacuum responsive valve assembly 121 is effective to avoid any possible shock which would occur during the abrupt coupling of the clutch assembly and also to avoid any possible racing of the automobile engine which would occur when the clutch assembly is being coupled.

Where the gearshift lever 33 is shifted from the neutral position "N" to any one of the first, second, third and fourth gear positions "1", "2", "3" and "4", a transmission synchronizer, comprised of synchronizer rings, in the transmission unit TU is operated during the shift of the gearshift lever 33 to the corresponding gear position to synchronize associated mating power train gears with each other prior to the engagement of such mating power train gears, and the associated mating power train gears are subsequently meshed to each other. This mode of operation takes place when the clutch assembly 17 is uncoupled. However, at the time the clutch assembly 17 is coupled, that is, when the gearshift lever 33 being moved has completed its movement through a distance which is 80% of the total stroke of movement thereof from the neutral position "N" to such one of the first to fourth gear positions, the associated mating power train gears have substantially already been meshed with each other.

When the driver subsequently releases his hand from the knob body 94 when and after the gearshift lever 33 has been moved to the first gear position "1", the knob body 94 returns to the neutral position about the transverse pivot pin 97, permitting the switches F and H, which have been opened, to be closed. However, since the first switch A has been closed with the movable contact element 80 bridging between the contact elements 80a and 80c at this time, the junction J in the control circuit SC is still grounded through the switch A and then through the switch G. Therefore, the transistor 140 in the control circuit SC is switched off and the electromagnetic coil 107d is accordingly deenergized. In view of this, at the time of completion of the shift of the gearshift lever 33 to the first gear position "1", the clutch assembly 17 has already been held in the coupled condition.

When the gearshift lever 33 has been shifted to the first gear position "1" in the manner as hereinbefore described, there may be the possibility that, because of any possible variation of the load imposed on the engine and/or because of any possible vibration imposed on the automobile during the running on a rough road surface, the gearshift lever 33 in the first gear position "1" may be rocked fore and after alternately in the directions X and Y to such an extent as to move a distance exceeding 20% of, and within the range of, for example, 20 to 40% of, the total stroke of movement of the gearshift lever 33 from the first gear position "1" back to the neutral position. If this happens, the movable contact bridge 80 may disengage from the contact element 80a and the movable contact bridge 81 may contact the contact element 81a, thereby switching the switches A and C off and on, respectively. However, even though the switches A and C are opened and closed errornously in the manner described above, there is no possibility that the electromagnetic coil 107d is energized. This is because all of the switches F, G and H in the knob assembly 34 are closed so long as the knob body 94 is released from the external force necessary to pivot it about the transverse pivot pin 97 in either direction X2 or Y2 and, therefore, the junction J in the control circuit SC is grounded through the contact element 80c, then through the switch C and finally through the switches H and G. In view of this, there is no possibility of the clutch assembly 17 being repeatedly coupled and uncoupled in a short period of time, accompanied by the racing of the automobile engine, which would result from vibrations of the transmission unit TU.

Where the driver desires to shift the gearshift lever 33 from the first gear position "1" to the second gear position "2", he has to pull the gearshift lever 33 from the first gear position "1" in the direction Y. Prior to the start of movement of the gearshift lever 33 in the direction Y towards the second gear position "2", the driver naturally applies the pulling force to the knob body 94, causing the knob body 94 to pivot in the direction Y2 about the transverse pivot pin 97 with the switch G consequently opened. The opening of the switch G that takes place prior to the movement of the gearshift lever 33 towards the second gear position "2" from the first gear position "1" results in the isolation of the junction J in the control circuit SC from the ground, permitting the current from the power source ES to flow to the base of the transistor 140 to switch the latter on. Accordingly, the electromagnetic coil 107d is energized in the manner as hereinbefore described and the electromagnetically operated valve assembly 107 is brought in position to communicate the fluid passages 108 and 109 with each other. Accordingly, as is the case where the gearshift lever 33 is held in the neutral position "N", the clutch assembly 17 is uncoupled.

As the gearshift lever 33 is subsequently moved from the first gear position towards the second gear position in the direction Y while the knob body 94 is still pivoted in the direction Y2 about the transverse pivot pin 97, the shift and select shaft 41 is rotated clockwise as viewed in FIG. 1 in the manner as hereinbefore described, thereby moving the shifter fork 60 in the rightward direction as viewed in FIG. 3 to set the power transmission gear train of the transmission unit TU in a selected gear ratio corresponding to the second gear position "2" of the gearshift lever 33. At the same time, the contact carrier 76 of the stroke switch assembly 71 is rotated in the direction Y1 as viewed in FIG. 7.

When and after the gearshift lever 33 being moved towards the second gear position "2" in the direction Y has completed its movement through a distance corresponding to 20% of the total stroke of movement from the first gear position "1" to the junction between the guide slots 35a and 35c, that is, a position intermediately of the distance between the first and second gear positions "1" and "2", the first switch A in the stroke switch assembly 71 is opened and the third switch C in the same stroke switch assembly 71 is closed. In this condition, since the switch G in the knob assembly 34 is opened, the junction J in the control circuit SC has not yet been grounded and, therefore, the electromagnetic coil 107d is still energized. However, as the gearshift lever 33 being further moved towards the second gear position "2" is moved a distance exceeding 70% of the total stroke of movement of the gearshift lever 33 from the first gear position "1" to the position intermediately of the distance between the first and second gear positions "1" and "2", the switch C in the stroke switch assembly 71 is opened. The third switch C in the stroke switch assembly 71 once opened in the manner described above is again closed when the gearshift lever 33 still moved towards the second gear position "2" has moved a distance exceeding 30ξ of the total stroke of movement of the gearshift lever 33 from the position intermediately of the distance between the first and second gear positions "1" and "2" to the second gear position "2", the closure of said third switch C being maintained until the gearshift lever 33 completes its movement towards the second gear position "2" through a distance corresponding to 80% of the total stroke of movement thereof from the position intermediately of the distance between the first and second gear positions "1" and "2" to the second gear position "2". On the other hand, when and after the gearshift lever 33, is, during its continued movement towards the second gear position "2" past the intermediate position between the first and second gear positions "1" and "2", moved a distance corresponding to 80 to 100% of the total stroke of movement of the gearshift lever 33 from the intermediate position to the second gear position "2", the contact elements 80b and 80c are electrically connected to each other through the contact bridge 80, that is, the second switch B is closed.

It is to be noted that, even though the third switch C is closed in the manner described above, the electromagnetic coil 107d is energized with the clutch assembly 17 consequently uncoupled so long as the pulling force is applied to the knob body 94 of the knob assembly 34 during the movement of the gearshift lever 33 towards the second gear position "2". This is because the switch G is still opened during that time. However, when the second switch B is closed in the manner described above, the current from the junction J in the control circuit SC flows to the ground through the second switch B and then through the switch F and, accordingly, substantially at the same time as the gearshift lever 33 has been moved to the second gear position "2", The electromagnetic coil 107d is deenergized as is the case when the gearshift lever 33 has been moved to the first gear position "1", thereby permitting the clutch assembly 17 to be coupled.

However, when the pulling force applied to the knob body 94 is released after the gearshift lever 33 has completely been moved to the second gear position "2", the switch G once opened is again closed. In view of all of the switches F, G and H being closed, the electromagnetic coil 107d is kept in the deenergized condition with the clutch assembly 17 consequently held in the coupled position. Even after the gearshift lever 33 has completely been moved to the second gear position "2", there may be the possibility that the gearshift lever 33 once set in the second gear position "2" may be rocked fore and aft in the direction X towards the intermediate position between the first and second gear positions "1" and "2" under the influence of vibrations of the transmission unit TU to such an extent as to move a distance exceeding 20% of the total stroke of movement of the gearshift 33 from the second gear position to the intermediate position between the first and second gear positions "1" and "2", that is, to move a distance diverting from the range in which the shift of the gearshift lever 33 to the second gear position "2" completes. In such case, the second and third switches B and C may be opened and closed, respectively. However, as is the case where the gearshift lever 33 is completely moved to the first gear position "1" described hereinbefore, since all of the switches F, G and H in the knob assembly 34 are closed so long as any force is applied to the knob body 94 and since the junction J in the control circuit SC is grounded through a series circuit of the switches B and F or through a series circuit of the switches C, H and G, the electromagnetic coil 107d is kept in the deenergized condition and, therefore, the clutch assembly 12 is kept in the coupled position irrespective of the rocking motion of the gearshift lever 33 resulting from the vibrations of the transmission unit TU.

Where the driver attempts to shift the gearshift lever 33 from the second gear position "2" to the third gear position "3", he has to move the gearshift lever 33 in the direction X from the second gear position "2" along the guide slot 35d, then move the gearshift lever 33 laterally into the guide slot 35a in the direction W towards the neutral position "N" and finally move the same in the direction X along the guide slot 35e towards the third gear position "3". During the movement of the gearshift lever 33 in the direction W towards the neutral position "N", the shift and select shaft 41 is axially moved in the direction close towards the transmission housing in the manner described hereinbefore to bring the inner end of said shift and select shaft 41 into engagement with the corresponding shifter fork 61. The subsequent movement of the gearshift lever 33 in the direction X from the neutral position towards the third gear position "3" along the guide slot 35e results in displacement of the shifter fork 61 to set the power transmission gear train in a selected gear ratio corresponding to the third gear position "3" of the gearshift lever 33. Even in this case, the circuit shown in FIG. 14 operated in a manner similar to that during the shift of the gearshift lever 33 from the neutral position "N" to the first gear position "1".

On the other hand, where the gearshift lever 33 set in the third gear position "3" is to be moved to the fourth gear position, it must be moved only in the direction Y along the guide slot 35e and then the guide slot 35f past the neutral position "N". As the gearshift lever 33 is so moved, the corresponding shifter fork 41 is displaced rightwards as viewed in FIG. 3 in a manner similar to that described hereinbefore in connection with the shift of the gearshift lever 33 from the first gear position "1" towards the second gear position "2" on one hand and, on the other hand, the contact carrier 76 is rotated in the direction Y2 as viewed in FIG. 7 in a manner similar to that described hereinbefore in connection with the shift of the gearshift lever 33 from the first gear position "1" towards the second gear position "2". Accordingly, in a manner similar to that described hereinbefore in connection with the shift of the gearshift lever 33 from the first gear position towards the second gear position, the clutch assembly 17 is operated.

Where the gearshift lever 33 is to be moved from the neutral position "N" towards either the parking gear position "P" or the reverse gear position "R", the gearshift lever 33 must be moved in the direction W along the guide slot 35d and, then, moved laterally in the required direction X or Y along the glide slot 35g or 35h. However, it is to be noted that, when the gearshift lever 33 is so moved to the parking gear position "P", the shifter fork 62 displaced rightwards as viewed in FIG. 3 in a manner similar to that described in connection with the leftward displacement of any one of the shifter forks 60 and 61 causes the normally opened switch assembly 63 to be closed in the manner described in connection with the construction of said switch assembly 63. On the other hand, when the gearshift lever 33 is so moved to the reverse gear position "R", the shifter fork 62 engaged with the inner end of the shift and select shaft 41 is displaced rightwards as viewed in FIG. 3 with the normally opened switch assembly 147 being consequently closed. At the time of completion of the movement of the gearshift lever 33 to the reverse gear position, the movable contact bridge 82 is brought in position to bridge between the contact elements 82b and 82d, that is, the switches D and E are opened and closed, respectively, and, accordingly, the backup light 146 is lit. Even in this case, that is, during the shift of the gearshift lever 33 from the neutral position "N" to either the parking gear position "P" or the reverse gear position "R", the clutch assembly 17 is operated in a manner similar to that hereinbefore described in connection with the shift of the gearshift lever 33 between the first and second gear positions.

Although the present invention has been described in connection with the illustrated, preferred embodiment thereof, it is to be noted that various changes and modifications are apparent to those skilled in the art. By way of example, although the contact band 87 in the knob assembly 34 has been described as electrically connected to the contact member 89, it may be electrically insulated from each other, in which case an additional switch I may be incorporated in the knob assembly 34 as electrically connected in series with the switch H. More specifically, this can readily be achieved by using an additional contact member 150 having one end connected to the contact band 86 and the other end adapted to be selectively engaged to and disengaged from the contact band 87 in opposed relation to the contact member 90 of the switch H.

Figure 16:
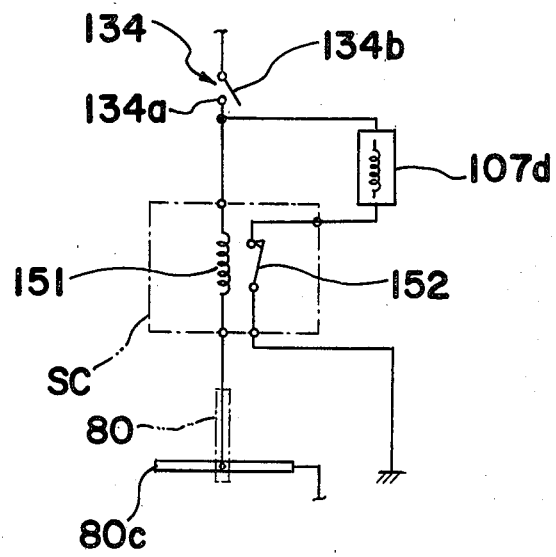
FIG. 16 is an electric circuit diagram showing a modified form of control circuit used in the circuit of FIG. 14.

In addition, although the solenoid control circuit SC has been described as comprising the switching transistor 140 and the diodes 141, 143 and 144, it may comprise a relay unit including, as shown in FIG. 16, a relay coil 151, connected in series between the main switch 134 and the contact element 80c in the stroke switch assembly 71, and a relay switch 152 connected in series between the main switch 134 and the ground through the electromagnetic coil 107d. In this case, the relay switch 152 must be of a type normally closed, but capable of opening when the relay coil 151 is energized.

Accordingly, such changes and modifications should be construed as included within the true scope of the present invention unless they depart therefrom.

We claim:

1. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between an automobile engine and the transmission unit and, when in the uncoupled position, interrupting such power transmission, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source; and a switching circuit including a stroke switch assembly and a knob switch assembly and operable to control the operation of the control circuit, said stroke switch assembly including normally opened first, second and third switches, said first switch being closed in response to the movement of the gearshift lever in the first gear-shifting direction, said second switch being closed in response to the movement of the gearshift lever in the second gear-shifting direction and said third switch being closed in response to the movement of the gearshift lever in any one of the first and second gear-shifting directions, all of said first to third switches being connected in parallel to each other, and said knob switch assembly being incorporated in a manipulatable knob assembly mounted on the gearshift lever for pivotal movement in first and second switching directions opposite for each other and includes a normally closed fourth switch connected with the second switch, a normally closed fifth switch connected with the first switch and a normally closed sixth switch connected in series with the third switch, said fourth and sixth switches being opened in response to the pivotal movement of the knob assembly in the first switching direction resulting from the application of an external manipulative force required to move the gearshift lever in the first gear-shifting direction, said fifth switch being opened in response to the pivotal movement of the knob assembly in the second switching direction resulting from the application of another external manipulative force required to move the gearshift lever in the second gear-shifting direction.

2. An apparatus as claimed in claim 1, wherein any one of the first and second switches is closed when the gearshift lever is moved from a neutral position a distance corresponding to 80 to 100% of the total stroke required for the gearshift lever to move from the neutral position to any one of the different gear positions of the corresponding group in the corresponding direction, and said third switch is closed when the gearshift lever is moved from the neutral position a distance corresponding to 30 to 80% of said total stroke.

3. An apparatus as claimed in claim 1, wherein said control circuit comprises a switching transistor having a base connected to the electric power source, an emitter connected to the ground and a collector connected to the electric power source through the electromagnetic control, said stroke switch assembly being connected to a junction between the electric power source and the base of said switching transistor.

4. An apparatus as claimed in claim 2, wherein said control circuit comprises a switching transistor having a base connected to the electric power source, an emitter connected to the ground and a collector connected to the electric power source through the electromagnetic control, said stroke switch assembly being connected to a junction between the electric power source and the base of said switching transistor.

5. An apparatus as claimed in claim 1, wherein said control circuit comprises a relay unit including a relay coil connected in series between the stroke switch assembly and the electric power source, and a relay switch connected in series with the electromagnetic control, said relay coil when energized opening said relay switch.

6. An apparatus as claimed in claim 2, wherein said control circuit comprises a relay unit including a relay coil connected in series between the stroke switch assembly and the electric power source, and a relay switch connected in series with the electromagnetic control, said relay coil when energized opening said relay switch.

7. An apparatus as claimed in claim 1, 2, 3, 4, 5 or 6, further comprising a backup light circuit including a backup light and a backup light switch connected in series with each other and also with the electric power source, said backup light switch being a normally opened switch and adapted to be closed in response to the movement of the gearshift lever towards the reverse gear position, and wherein said stroke switch assembly further includes a normally opened seventh switch which is closed in response to the movement of the gearshift lever in the second gear-shifting direction towards any one of the gear positions of the another group.

8. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between an automobile engine and the transmission unit and, when in the uncoupled position, interrupting such power transmission, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source; and a switching circuit including a stroke switch assembly and a knob switch assembly connected in series with each other for controlling the operation of the control circuit, said stroke switch assembly including normally opened first and second switches, said first and second switches being closed in response to the movement of the gearshift lever in the first and second gear-shifting directions, respectively and connected in parallel to each other, and said knob switch assembly being incorporated in a manipulatable knob assembly mounted on the gearshift lever for pivotal movement in first and second switching directions opposite to each other and includes a normally closed third switch connected in series with the second switch and a normally closed fourth switch connected in series with the first switch said third switch being opened in response to the pivotal movement of the knob assembly in the first switching direction resulting from the application of an external manipulative force required to move the gearshift lever in the first gear-shifting direction, said fourth switch being opened in response to the pivotal movement of the knob assembly in the second switching direction resulting from the application of another external manipulative force required to move the gearshift lever in the second gear-shifting direction.

9. An apparatus as claimed in claim 8, wherein said control circuit comprises a switching transistor having a base connected to the electric power source, an emitter connected to the ground and a collector connected to the electric power source through the electromagnetic control, said stroke switch assembly being connected to a junction between the electric power source and the base of said switching transistor.

10. An apparatus as claimed in claim 8, wherein said control circuit comprises a relay unit including a relay coil connected in series between the stroke switch assembly and the electric power source, and a relay switch connected in series with the electromagnetic control, said relay coil when energized opening said relay switch.

11. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between the automobile engine and the transmission unit, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source;

a switching circuit including a stroke switch assembly and a knob switch assembly connected in series with each other for controlling the operation of the control circuit, said stroke switch assembly including normally opened first, second and third switches, said first switch being closed in response to the movement of the gearshift lever in the first gear-shifting direction, said second and third switch being closed in response to the movement of the gearshift lever in the second gear-shifting direction, and said knob switch assembly being incorporated in a manipulatable knob assembly mounted on the gearshift lever for pivotal movement in first and second switching directions opposite to each other and includes a normally closed fourth switch connected in series with the second switch and a normally closed fifth switch connected in series with the first switch, said fourth switch being opened in response to the pivotal movement of the knob assembly in the first switching direction resulting from the application of an external manipulative force required to move the gearshift lever in the first gear-shifting direction, said fifth switch being opened in response to the pivotal movement of the knob assembly in the second switching direction resulting from the application of another external manipulative force required to move the gearshift lever in the second gearshifting direction; and a backup light circuit including a backup light and a back-up light switch connected in series with each other and also between the third switch and the electric power source, said backup light switch being a normally opened switch and adapted to be closed in response to the movement of the gearshift lever towards the reverse gear position.

12. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between the automobile engine and the transmission unit and, when in the uncoupled position, interrupting such power transmission, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source;

a switching circuit including a stroke switch assembly and a knob switch assembly connected in series with each other for controlling the operation of the control circuit, said stroke switch assembly including normally opened first and second switches adapted to be closed in response to the movement of the gearshift lever in the first and second gear-shifting directions, respectively, said first and second switches being connected in parallel to each other, said knob switch assembly being incorporated in a manipulatable knob assembly mounted on the gearshift lever for pivotal movement in first and second switching directions opposite to each other and including a normally closed third switch connected in series with the second switch and a normally closed fourth switch connected in series with the first switch, said third switch being opened in response to the pivotal movement of the knob assembly in the first switching direction resulting from the application of an external manipulative force required to move the gearshift lever in the first gear-shifting direction, said fourth switch being opened in response to the pivotal movement of the knob assembly in the second switching direction resulting from the application of another external manipulative force required to move the gearshift lever in the second gear-shifting direction, said stroke switch assembly comprising a movable contact carrier operatively coupled to the gearshift lever for pivotal movement first and second positions in response to the movement of the gearshift lever in the first and second gear-shifting directions, respectively, said movable carrier having a contact bridge mounted thereon, and a switch board fixed relative to said movable contact carrier and having first, second and third contact elements, said first switch of the stroke switch assembly being constituted by said first and second contact elements and said contact bridge, said second switch of the stroke switch assembly being constituted by said second and third contact elements and said contact bridge, said second contact element being electrically connected to the control circuit.

13. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the uncoupled position, interrupting a power transmission between the automobile engine and the transmission unit and, when in the coupled position, establishing such power transmission, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source; and a switching circuit including a stroke switch assembly and a knob switch assembly connected in series with each other for controlling the operation of the control circuit, said stroke switch assembly including normally opened first and second switches adapted to be closed in response to the movement of the gearshift lever in the first and second gear-shifting directions, respectively, said first and second switches being connected in parallel to each other, said knob switch assembly being incorporated in a manipulatable knob assembly and including normally closed third and fourth switches which are connected in series with the second and first switches, respectively, said knob assembly comprising a generally elongated carrier block having one end rigidly connected to the gearshift lever in coaxial relation thereto, said carrier block having a contact band turned around the free end portion thereof and also having first and second contact members connected at one end thereto, the respective free ends of the first and second contact members being engaged to the contact band in opposite directions by the action of their respective resiliency, and a manipulatable knob body having a hollow defined therein and mounted on the carrier block, with the free end portion of said carrier block received in said hollow, for pivotal movement in first and second switching directions opposite to each other, said knob body having a projection protruding axially into the hollow and terminating spaced a slight distance from the free end face of the carrier block, said projection, when the knob body is pivoted in the first switching direction by the application of an external manipulative force applied thereto during the shifting of the gearshift lever in the first gear-shifting direction, separating the first contact member away from the contact band, said projection, when the knob body is pivoted in the second switching direction by the application of another manipulative force applied thereto during the shifting of the gearshift lever in the second gear-shifting direction, separating the second contact member away from the contact band, said third switch being constituted by said first contact member and said contact band, said fourth switch being constituted by said second contact member and said contact band.

14. An apparatus as claimed in claim 1, wherein said fourth and fifth switches are connected in series with the second and first switches, respectively.

15. An electric switch apparatus for use in association with an automotive power train including a manually shiftable transmission unit, which comprises a gearshift lever movable in first and second gear-shifting directions opposite to each other, said gearshift lever when moved in the first gear-shifting direction being shiftable to any one of different gear positions of one group and, when moved in the second gear-shifting direction, shiftable to any one of different gear positions of another group including a reverse gear position, and an automatically controlled clutch unit intervening between the transmission unit and an automobile engine and capable of assuming coupled and uncoupled positions one at a time, said clutch unit when in the coupled position establishing a power transmission between the automobile engine and the transmission unit and, when in the uncoupled position, interrupting such power transmission, said electric switch apparatus comprising, in combination:

an actuator means including an electromagnetic control electrically connected to a source of electric power and operable to bring the clutch unit into the uncoupled and coupled positions when the electromagnetic control is energized and deenergized, respectively;

a control circuit for selectively opening and completing an electric circuit between the electromagnetic control and the electric power source; and a switching circuit including a stroke switch assembly and a knob switch assembly for controlling the operation of the control circuit, said stroke switch assembly including normally opened first, second and third switches, said first switch being closed in response to the movement of the gearshift lever in the first gear-shifting direction, said second switch being closed in response to the movement of the gearshift lever in the second gear-shifting direction and said third switch being closed in response to the movement of the gearshift lever in any one of the first and second gear-shifting directions, all of said first to third switches being connected in parallel to each other, and said clutch unit being held in the coupled position when at least the first switch is closed where an external force required to move the gearshift lever in the first gear-shifting direction is applied to a knob mounted on the gearshift lever, and also when at least the second switch is closed where an external force required to move the gearshift lever in the second gear-shifting direction is applied to the knob,
said clutch unit being also held in the coupled position when any one of the first to third switches is closed where no external force is applied to the knob.

* * * * *